(12) United States Patent
Martin

(10) Patent No.: US 12,543,631 B2
(45) Date of Patent: Feb. 10, 2026

(54) ACTUATOR FOR SETTING SEED DEPTH FOR A ROW UNIT ON A PLANTER

(71) Applicant: Deere & Company, Moline, IL (US)

(72) Inventor: Robert W. Martin, Davenport, IA (US)

(73) Assignee: Deere & Company, Moline, IL (US)

( * ) Notice: Subject to any disclaimer, the term of this patent is extended or adjusted under 35 U.S.C. 154(b) by 744 days.

(21) Appl. No.: 17/892,641

(22) Filed: Aug. 22, 2022

(65) Prior Publication Data

US 2024/0057517 A1     Feb. 22, 2024

(51) Int. Cl.
*A01C 7/20*     (2006.01)
*A01B 63/32*    (2006.01)

(52) U.S. Cl.
CPC .............. *A01C 7/203* (2013.01); *A01B 63/32* (2013.01); *A01C 7/205* (2013.01)

(58) Field of Classification Search
CPC .................. A01C 7/201–205; A01B 63/24–32
See application file for complete search history.

(56) References Cited

U.S. PATENT DOCUMENTS

| | | | |
|---|---|---|---|
| 3,432,184 A * | 3/1969 | Tweedy | A01B 63/111 280/481 |
| 10,537,055 B2 | 1/2020 | Gresch et al. | |
| 10,743,455 B2 | 8/2020 | Sloneker et al. | |
| 10,827,663 B2 | 11/2020 | Gresch et al. | |
| 2015/0351313 A1* | 12/2015 | Dienst | A01B 49/06 172/668 |
| 2018/0331638 A1* | 11/2018 | Basthol | H02P 6/08 |
| 2018/0338413 A1* | 11/2018 | Connell et al. | B62D 55/065 |
| 2019/0110388 A1 | 4/2019 | Gresch et al. | |
| 2020/0281112 A1* | 9/2020 | Salowitz et al. | A01C 5/064 |

FOREIGN PATENT DOCUMENTS

| | | | | |
|---|---|---|---|---|
| CA | 2473020 C | * | 6/2009 | ............. A01C 7/042 |
| DE | 102020105709 A1 | * | 9/2021 | ............. F16H 25/20 |
| WO | WO-2019169412 A1 | * | 9/2019 | ............. A01B 63/20 |
| WO | WO 2021/064513 A1 | | 4/2021 | |

OTHER PUBLICATIONS

Würl, Konrad, DE 10 2020 105709 A1 (Sep. 9, 2021), machine translation. (Year: 2021).*
Extended European Search Report and Written Opinion issued in European Patent Application No. 23180617.5, Jan. 29, 2024, in 10 pages.

* cited by examiner

*Primary Examiner* — Tara Mayo
(74) *Attorney, Agent, or Firm* — Christopher R. Christenson; Kelly, Holt & Christenson PLLC

(57) ABSTRACT

An agricultural planter row unit has a trench opener fixed to a support frame and a gauge wheel supported by a gauge wheel arm to control planting depth. An electric actuator drives movement of a linkage with a mechanical stop that bears against the gauge wheel support arm to position the gauge wheel to obtain the desired planting depth. A seed depth control system receives an operator input, from an operator compartment of a towing vehicle, and automatically controls actuation of the seed depth actuator.

20 Claims, 14 Drawing Sheets

ACTUATOR FOR SETTING SEED DEPTH FOR A ROW UNIT ON A PLANTER

FIELD OF THE DESCRIPTION

The present description relates to agricultural machines. More specifically, the present description relates to setting a planting depth on a planter row unit.

BACKGROUND

There are a wide variety of different types of agricultural machines. Some agricultural machines include planters that have row units. For instance, a row unit is often mounted on a planter with a plurality of other row units. The planter is often towed by a tractor over soil where seed is planted in the soil, using the row units. The row units on the planter follow the ground profile by using a combination of a downforce assembly that imparts a downforce on the row unit to push disc openers into the ground and gauge wheels to set depth of penetration of the disc openers. Some current downforce assemblies provide a relatively fixed downforce. Some allow an operator to change the downforce applied to the row unit by adjusting a mechanical mechanism on the row unit, and others allow the operator to change the downforce from the operator compartment.

In many current systems, the gauge wheels are mounted to the row unit by one or more gauge wheel arms. Setting the seed depth on the planter is done by stopping the planter, exiting the operator compartment and manually adjusting a gauge arm stop to limit movement of the gauge wheel relative to the disc opener. The manual adjustment mechanism often uses a spindle drive, a handle, or another mechanical mechanism that can be used to adjust seed depth. This type of adjustment is somewhat cumbersome and time consuming. It also does not lend itself to frequent changes, because of its cumbersome and time consuming nature.

Therefore, many planting operations are performed with sub-optimal planting seed depth settings. This can result in a loss of yield potential. For instance, at the beginning of a corn planting operation, the operator may set the seed depth to two inches and then leave it at that depth until the corn planting operation is completed. The operator may leave it at this depth even though the depth may be sub-optimal for changing environmental or soil characteristics.

The discussion above is merely provided for general background information and is not intended to be used as an aid in determining the scope of the claimed subject matter.

SUMMARY

Example 1 is a row unit on a planting machine that includes a support frame, a trench opener, a gauge wheel, a gauge wheel arm operably coupling the gauge wheel to the support frame, and a planting depth actuator assembly. The planting depth actuator assembly includes a linkage operably coupled to the gauge wheel arm to limit a range of motion of the gauge wheel arm, a screw member and a motor. The screw member is operably coupled to the linkage, has a threaded portion, a longitudinal axis, and is configured to move axially along the longitudinal axis to drive the linkage without rotating about the longitudinal axis. The motor is operably coupled to the screw member and energization of the motor causes the screw member to move axially.

Example 2 is the row unit of the previous example and further comprising a shank movably mounting the gauge wheel arm to the support frame, and wherein the planting depth actuator assembly includes an actuator body mounted to the shank and containing the screw member.

Example 3 is the row unit of any or all previous examples and further comprising a plurality of gears disposed within the actuator body and operably interposed between the motor and the screw member to increase mechanical advantage of the motor.

Example 4 is the row unit of any or all previous examples wherein the plurality of gears provides a mechanical advantage sufficient to prevent rotation of the motor when the motor is not energized to lock an axial position of the screw member.

Example 5 is the row unit of any or all previous examples wherein the plurality of gears provides a ratio of approximately 32:1 or higher.

Example 6 is the row unit of any or all previous examples wherein the plurality of gears includes a gear having a threaded surface engaged with the threaded portion of the screw member such that rotation of the gear causes axial movement of the screw member.

Example 7 is the row unit of any or all previous examples and further comprising a thrust bearing disposed between a face of the gear and the actuator body, the thrust bearing being configured to transfer axial loads from the screw member to the actuator body.

Example 8 is the row unit of any or all previous examples wherein the screw member includes a slot configured to engage a key that is mounted relative to the actuator body to inhibit rotation of the screw member.

Example 9 is the row unit of any or all previous examples wherein the linkage is pivotally mounted to the shank.

Example 10 is the row unit of any or all previous examples and further comprising a load cell operably interposed between the linkage and the mechanical stop in contact with the gauge wheel arm.

Example 11 is the row unit of any or all previous examples wherein the motor is an electrical smart motor with a rotary encoder.

Example 12 is the row unit of any or all previous examples wherein the motor is configured to communicate digitally on a communication bus.

Example 13 is the row unit of any or all previous examples wherein the communication bus is a Controller Area Network (CAN) bus.

Example 14 is a planting machine, comprising: a tow bar and a plurality of row units coupled to the tow bar. Each row unit includes a support frame, a double disk opener, a gauge wheel, a gauge wheel arm that couples the gauge wheel to the support frame, and an automatic planting depth actuator assembly. The automatic depth actuator assembly includes a linkage operably coupled to the gauge wheel arm to limit a range of motion of the gauge wheel arm, a screw member operably coupled to the linkage, the screw member having a threaded portion, and wherein the screw member has a longitudinal axis and is configured to move axially along the longitudinal axis to drive the linkage without rotating about the longitudinal axis, and a motor operably coupled to the screw member, wherein energization of the motor causes the screw member to move axially to adjust a position of the gauge wheel relative to the double disk opener.

Example 15 is the planting machine of any or all previous examples wherein the automatic planting depth actuator assembly further comprises a load cell operably interposed between the linkage and the mechanical stop in contact with the gauge wheel arm.

Example 16 is the planting machine of any or all previous examples and further comprising a control system operably coupled to the motor and the load cell, the control system being configured to generate a planting depth actuation signal to the automatic planting depth actuator based on a target planting depth.

Example 17 is the planting machine of any or all previous examples wherein the motor is a smart motor and is configured to communicate on a digital communication bus.

Example 18 is the planting machine of any or all previous examples wherein the motor is configured to provide an indication of motor torque and motor position to the control system.

Example 19 is a method of calibrating an automatic planting depth control system of row unit on a planting machine. The method includes: causing an electric motor, coupled to a screw member, to fully retract the screw member to a motion limit; lowering the row unit onto a flat surface; causing the electric motor to advance the screw member until contact with a gauge wheel arm of the row unit is detected while monitoring revolutions of the electric motor; saving the number of revolutions of the electric motor as a zero-depth position of the automatic planting depth control system; and employing the zero-depth saved position during operation of the automatic planting depth control system to control depth of the row unit.

Example 20 is the method of any or all previous examples wherein the electric motor is a smart motor and detection of at least one of the motion limit and contact with the gauge wheel arm is done by sensing torque of the electric smart motor. Contact with the gauge wheel arm may also be detected by reading a load cell on the linkage between the actuator and gauge wheel arms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
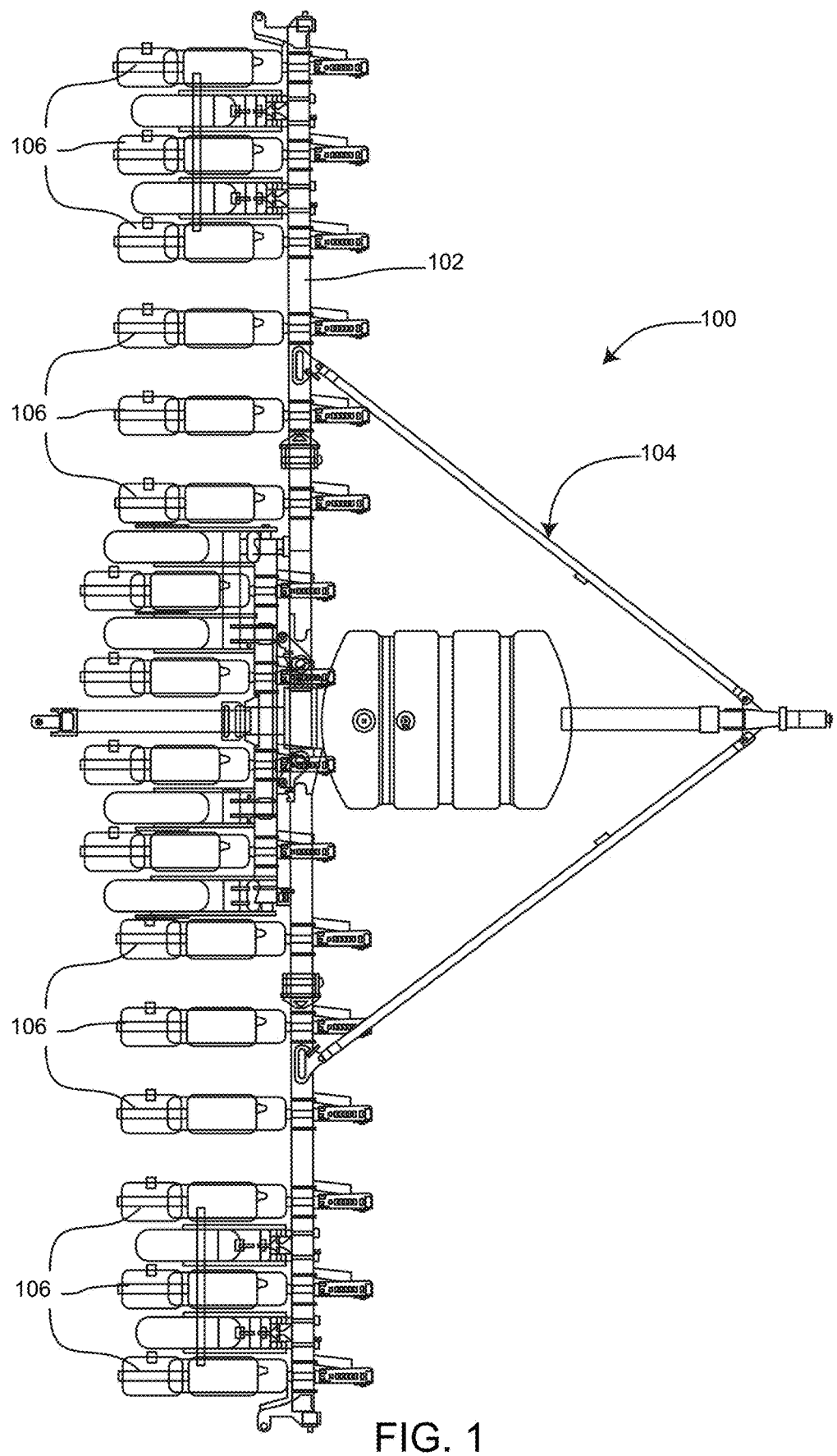
FIG. 1 is a top view of one example of a planting machine.

FIG. 1 is a top view of one example of an agricultural planting machine 100. Machine 100 is a row crop planting machine that illustratively includes a toolbar 102 that is part of a frame 104. FIG. 1 also shows that a plurality of planting row units 106 are mounted to the toolbar 102. Machine 100 can be towed behind another machine, such as a tractor.

Figure 2:
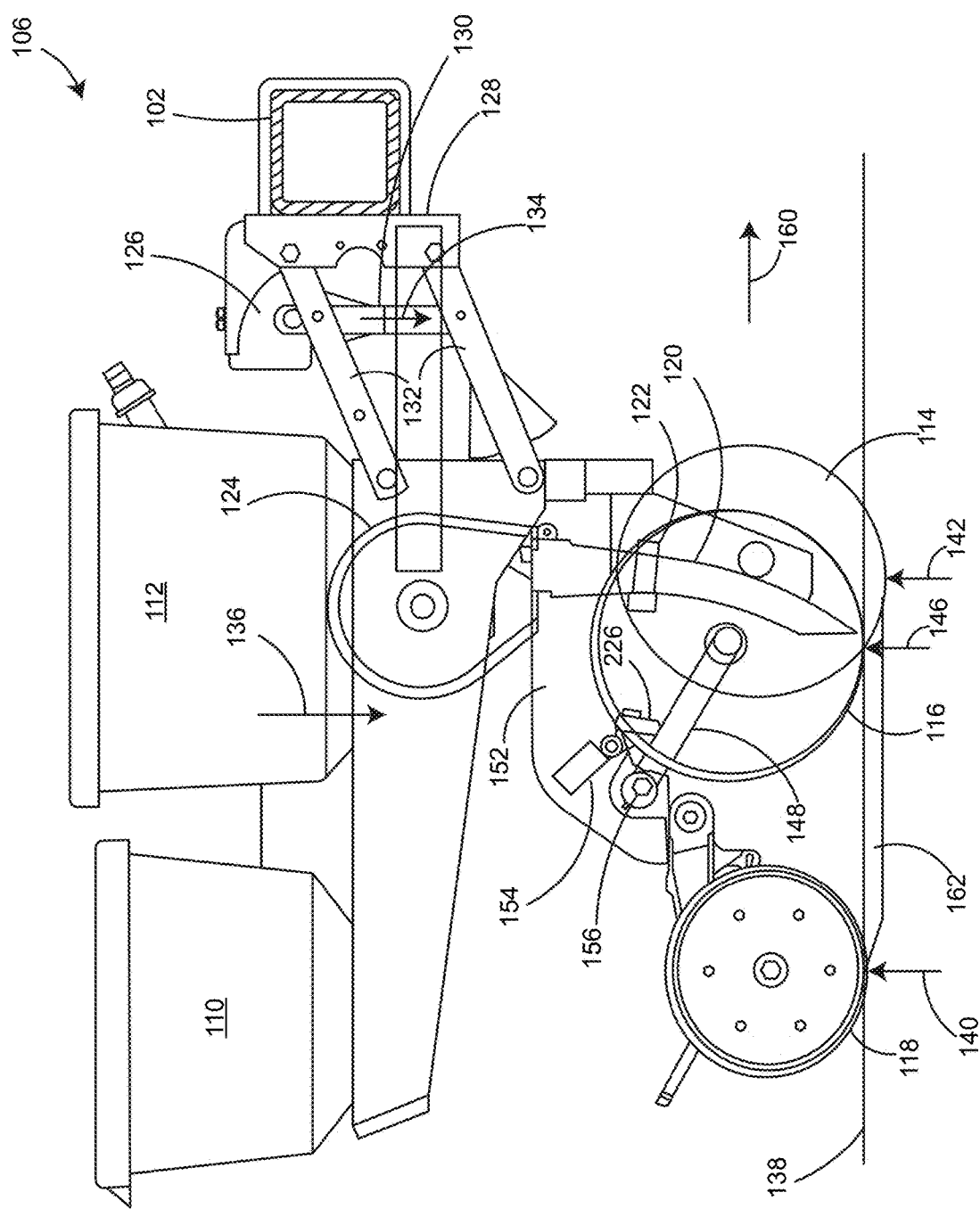
FIG. 2 shows a side view of one example of a row unit of the planting machine illustrated in FIG. 1.

FIG. 2 is a side view showing one example of a row unit 106. Row unit 106 illustratively includes a chemical tank 110 and a seed storage tank 112. It also illustratively includes a disc opener 114, a set of gauge wheels 116, and a set of closing wheels 118. Seeds from tank 112 are fed by gravity into a seed meter 124. The seed meter controls the rate at which seeds are dropped into a seed tube 120 or other seed delivery system, such as a brush belt, from seed storage tank 112. The seeds can be sensed by a seed sensor 122.

It will be noted that there are different types of seed meters, and the one that is shown is shown for the sake of example only. For instance, in one example, each row unit 106 need not have its own seed meter. Instead, metering or other singulation or seed dividing techniques can be performed at a central location, for groups of row units 106. The metering systems can include rotatable discs, rotatable concave or bowl-shaped devices, among others. The seed delivery system can be a gravity drop system (such as that shown in FIG. 2) in which seeds are dropped through the seed tube 120 and fall (via gravitational force) through the seed tube into the seed trench. Other types of seed delivery systems are assistive systems, in that they do not simply rely on gravity to move the seed from the metering system into the ground. Instead, such systems actively capture the seeds from the seed meter and physically move the seeds from the meter to a lower opening, where they exit into the ground or trench 162.

A downforce actuator 126 is mounted on a coupling assembly 128 that couples row unit 106 to toolbar 102. Actuator 126 can be a hydraulic actuator, a pneumatic actuator, a spring-based mechanical actuator or a wide variety of other actuators. In the example shown in FIG. 2, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on row unit 106, and indicated by arrow 136) is offset by upwardly directed forces acting on closing wheels 118 (from ground 138 and indicated by arrow 140) and double disc opener 114 (again from ground 138 and indicated by arrow 142). The remaining force (the sum of the force vectors indicated by arrows 134 and 136, minus the force indicated by arrows 140 and 142) and the force on any other ground engaging component on the row unit (not shown), is the differential force indicated by arrow 146. The differential force may also be referred to herein as the downforce margin. The force indicated by arrow 146 acts on the gauge wheels 116. This load can be sensed by a gauge wheel load sensor which may be located anywhere on row unit 106 where it can sense that load. It can also be placed where it may not sense the load directly, but a characteristic indicative of that load. Both sensing the load directly or indirectly are contemplated herein and will be referred to as sensing a force characteristic indicative of that load (or force). For example, it can be disposed near a set of gauge wheel control arms (or gauge wheel arm) 148 that movably mount gauge wheels 116 to shank 152 and control an offset between gauge wheels 116 and the discs in double disc opener 114, to control planting depth. Arms (or gauge wheel arms) 148 illustratively abut against a mechanical stop such as depth stop rocker 226. The position of depth stop rocker 226 relative to shank 152 can be set by a planting depth actuator assembly 154. Control arms 148 illustratively pivot around pivot point 156 so that, as planting depth actuator assembly 154 actuates to change the position of depth stop rocker 226, the position of gauge wheels 116 relative to the double disc opener 114, thus changing the depth at which seeds are planted. This is described in greater detail below.

In operation, row unit 106 travels generally in the direction indicated by arrow 160. The double disc opener 114 opens a furrow in the soil 138, and the depth of the furrow 162 is set by planting depth actuator assembly 154, which, itself, controls the offset between the lowest parts of gauge wheels 116 and disc opener 114. Seeds are dropped through seed tube 120, into the furrow 162 and closing wheels 118 close the soil.

In prior systems, in order to change the planting depth, the operator of the towing vehicle would dismount the towing vehicle and operate a mechanical actuator that would adjust the position of mechanical stop. This would be done on each row unit. In accordance with one example, actuator assembly 154 can be automatically actuated by a control system, from the operator compartment of the towing vehicle. It can be actuated based on an operator input detected through that control system, or it can be automatically actuated to automatically change the planting depth as row unit 106 is towed across the field. In one example, and as is described in greater detail below, it can be actuated to maintain a desired trench contour or trench profile so that the depth of the seed trench varies, in a desired way.

Figure 3:
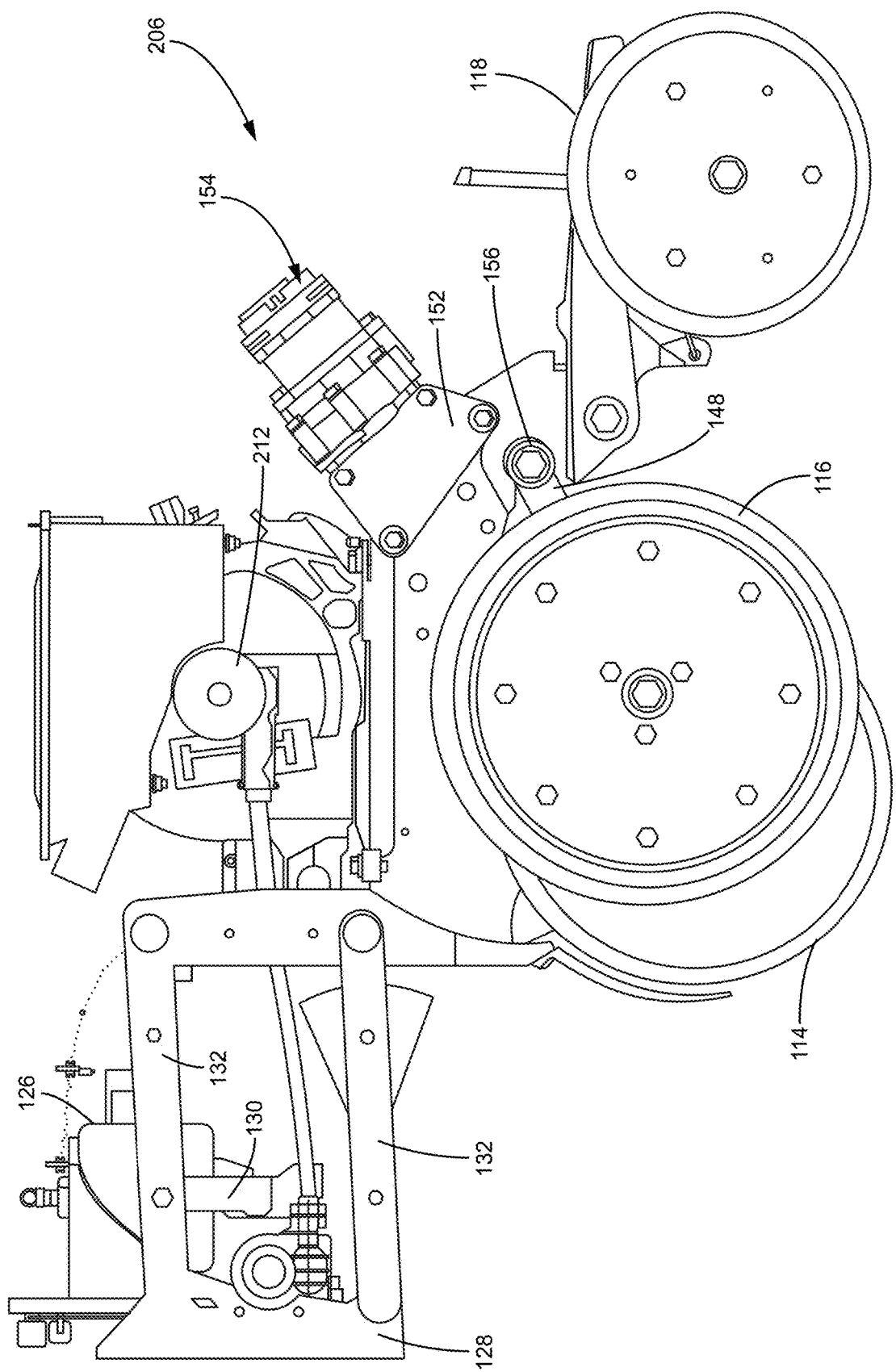
FIGS. 3 and 4 are diagrammatic side and rear views, respectively, of a row unit having a planting depth actuator assembly.
Figure 4:
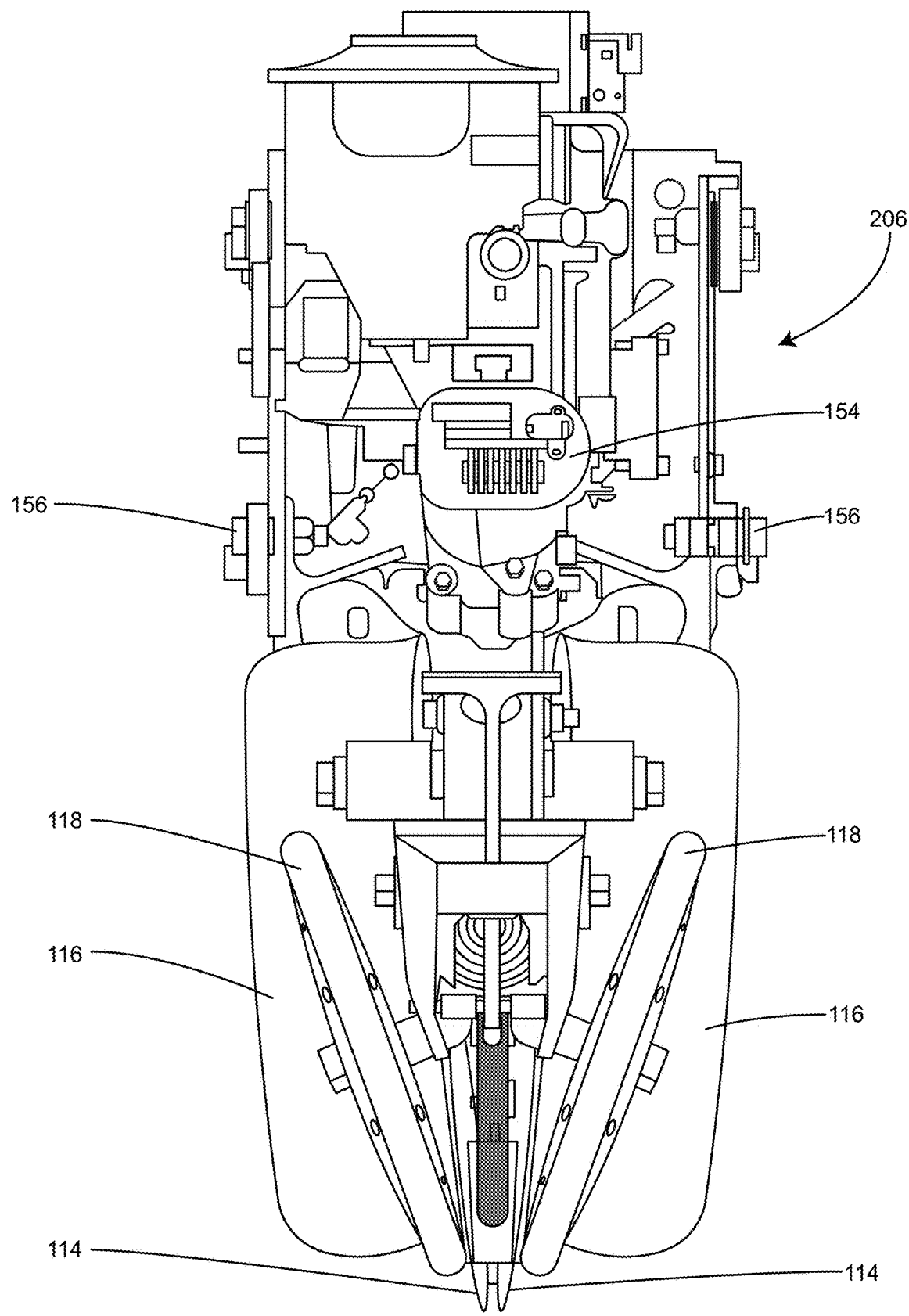

FIGS. 3 and 4 are diagrammatic side and rear views, respectively, of a row unit having a planting depth actuator assembly. Row unit 206 is similar to row unit 106, described above, and like components are numbered similarly. Seed meter 212 is mounted on top of shank 152 and provides seeds to a seed tube (not shown). Downforce actuator 126 is mounted on coupling assembly 128 that couples row unit 206 to toolbar 102. In the illustrated example, actuator 126 is a pneumatic actuator. Rod 130 is coupled to a parallel linkage 132 and is used to exert an additional downforce on row unit 206. Shank 152 of row unit 206 holds two rotatable opener disks 114 with the disk axes in a fixed position relative to shank 152. The disk axes are fixed such that the edges of disks 114 contact each other in one spot located near the top of the soil at the start of furrow creation. The outer surfaces of disks 114 diverge from each other from this point back. The lower portions of disks 114 are pushed into the soil at a set depth by force exerted on them through shank 152 and when row unit 206 is driven forward, a furrow is formed. The depth of furrow 162 below ground plane 138 is set and maintained by two gauge wheels 116 that run on the top of the soil on ground plane 138 and are positioned adjacent to each opener disk 114. Gauge wheels 116 take the excess load put on shank 152 that is not used up by the opener disks 114 for furrow creation, thus limiting the depth of opener disks 114. Each gauge wheel 116 is affixed to a rotatable arm 148 with a pivot 156 that is affixed to the opener shank 152. The position of gauge wheel arm 148, and thus the distance from the bottom of opener disks 114 relative to the bottom of gauge wheels 116, is controlled by an adjustable stop that contacts both gauge wheel arms 148 between the gauge wheels 116 and the gauge wheel arm pivots 156.

Figure 5:
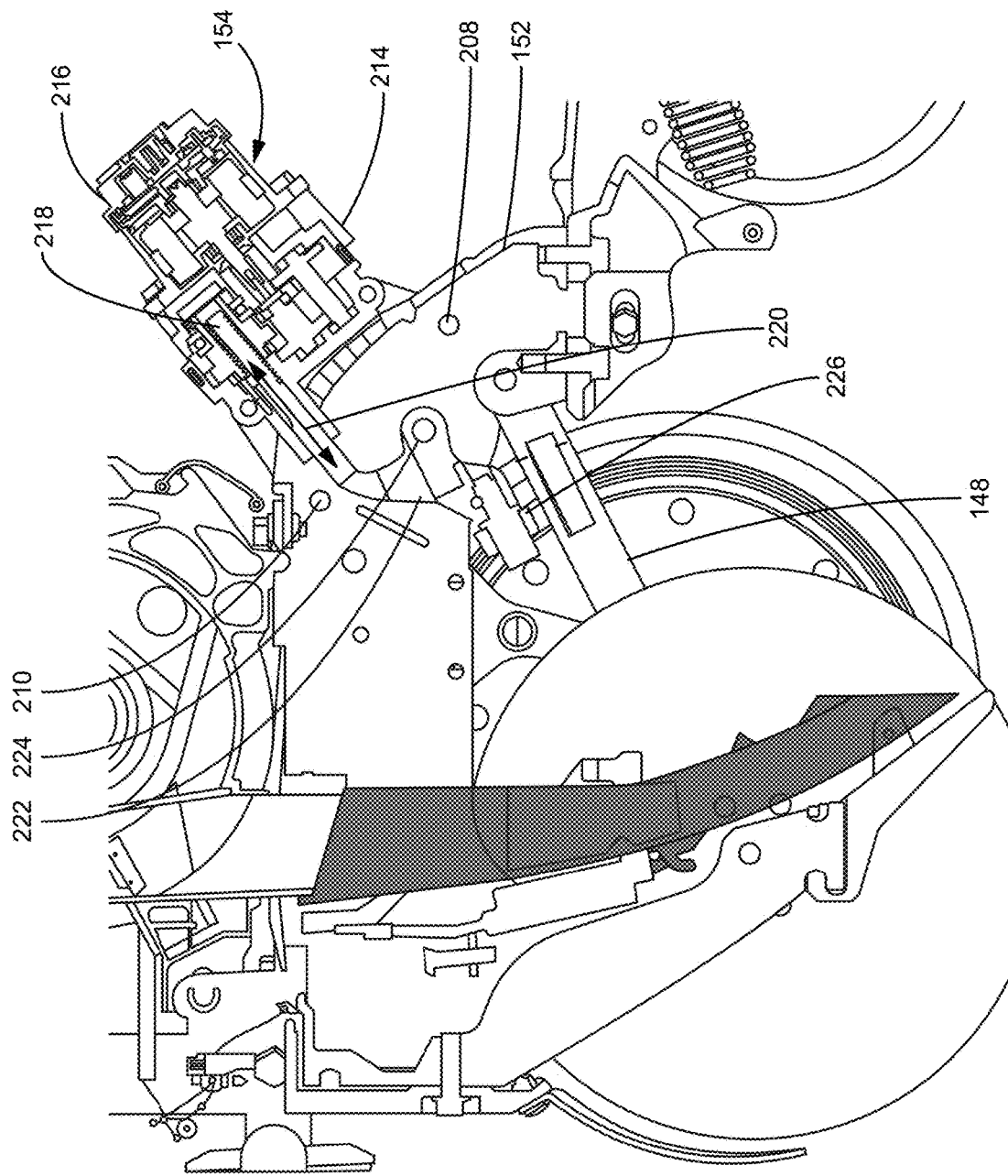
FIG. 5 is a cross-sectional view showing the actuator assembly illustrated in FIGS. and 4.

FIG. 5 is a cross-sectional view showing the actuator assembly illustrated in FIGS. 3 and 4. Actuator 154 is mounted to shank 152 at locations 208, 210. Actuator 154 includes an actuator body 214 to which an electric motor 216 is coupled. Rotation of motor 216 causes power screw 218 to advance or retract linearly in direction 220. Power screw 218 bears against depth stop arm 222, which pivots about depth stop arm pivot 224. Depth stop arm 222 moves depth stop rocker 226 which engages wheel arm 148 to limit the upper extent of rotation that wheel arm 148 may experience, thereby controlling depth.

Figure 6:
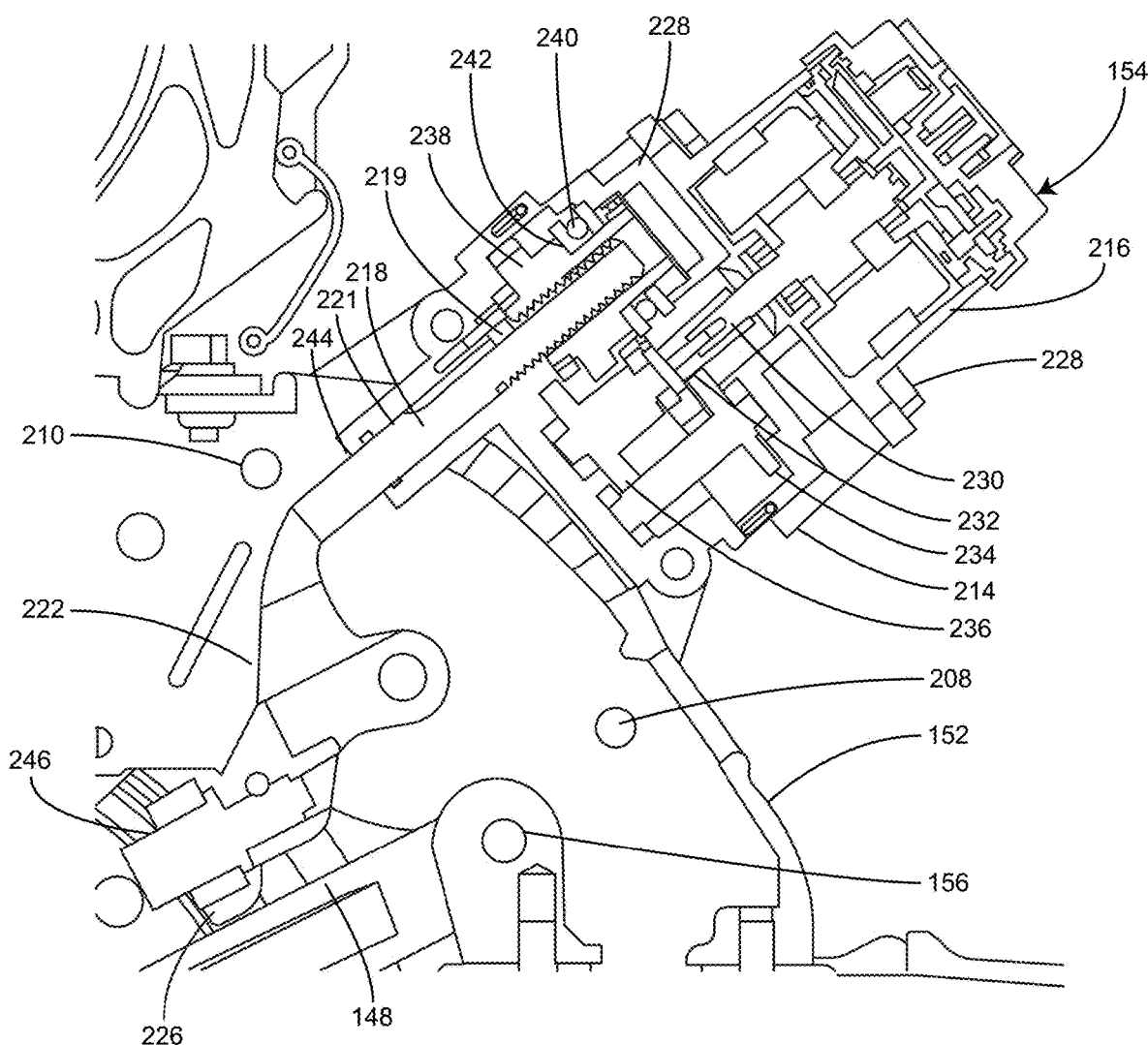
FIG. 6 is an enlarged cross-sectional view showing a portion of the actuator assembly illustrated in FIG. 5.

FIG. 6 is an enlarged cross-sectional view of the actuator assembly illustrated in FIG. 5. As shown in FIG. 6, motor 216 is mounted to actuator body 214 by one or more fasteners 228. Motor 216 has an output shaft 230 coupled to pinion gear 232. Pinion gear 232 engages gear 234 which engages gear 236, which engages gear 238. Gear 238 is internally threaded and engages power screw 218 such that rotation of motor 216 causes power screw 218 to move linearly in direction 220 (shown in FIG. 5). Gears 234, 236, and 238 form a gear train that provides mechanical advantage to motor 216. In one particular embodiment, the gear train is configured to provide a ratio of 32:1 which helps motor 216 overcome all of the friction in the system. However, those skilled in the art will recognize that other ratios may be used as well. Actuator 154 also includes a thrust bearing 240 that abuts surface 242 of gear 238. In this way, thrust bearing 240 receives all or most of the axial load of power screw 218. Thrust bearing 240 bears against an internal surface of actuator body 214 to transfer axial loads to actuator body 214. In the illustrated example, actuator 154 also include an o-ring disposed about power screw 218 to protect the internal workings of actuator 154 from dirt and moisture.

Motor 216 can be any suitable electric motor. However, in one example, motor 216 is an integrated smart brushless DC motor with an internal rotary encoder that keeps track of the rotary position of output shaft 230 down to about one degree. In examples, where motor 216 is a smart brushless DC motor, motor 216 may be configured to communicate on a Controller Area Network (CAN) bus in order to receive digital commands from an external device, such as a control system. In examples where motor 216 cannot sense rotation, an additional device, such as a rotary encoder, or other technique is required to track motor rotations. This could be accomplished with a proximity sensor sensing teeth that have been added to one of the gear sets. This could also be accomplished with a potentiometer in mesh with the gear train. In other examples, another type of position sensor is used to determine position of the motor and/or other element of actuator 154, such as power screw 218.

As shown in FIG. 6, depth stop arm 222 acts on gauge wheel arm 148 through element 246 and 226. In one example, element 246 is a downforce sensor. Sensor 246 may be in the form of a load cell, or other suitable structure that has an electrical characteristic that varies with force. However, in other examples, the load cell may be located in other suitable positions to sense downforce. Further, other types of sensors, such as a strain gauge or pressure sensor may be used to provide an indication of downforce. Finally, in examples where motor 216 is a smart motor, motor 216 may provide a direct indication of torque, calculated within the smart motor, based on current consumption and/or back emf. In such situations, motor torque may be related to the load on gauge wheel arm 148 via a lookup table and/or calibration. Additionally, it is expressly contemplated that multiple indications of force (e.g., load cell 246 and smart motor torque) may be received by the control system and used for redundancy or additional accuracy.

In the example illustrated, power screw 218 may be considered self-locking since all realistic forces that gauge wheel arm 148 can apply to power screw 218 will not cause motor 216 to rotate after passing through the gear train. When motor 216 is not actively driving the power screw 218, any forces that are occurring on power screw 218 are transmitted from there to thrust bearing 240, and finally to shank 152. This allows isolation of any impact forces that may impact gauge wheel 116, and thus gauge wheel arm 148, from electric motor 216 and thereby protects electric motor 216 from peak loads.

As shown in FIGS. 5 and 6, the adjustable stop can be a fixed member of a rotatable part or stop arm that pivots on a pin 224 fixed to the shank 152 or it can be a lever or rocker that pivots on a pin that is fixed to a rotatable part that pivots on a pin fixed to the shank 152. The rotation of the stop arm, thus the position of the stop, is controlled by power screw 218 that moves in a linear fashion and contacts the stop arm a given distance from the stop arm pivot. The power screw 218 may just come into simple contact with the stop arm or may be connected through a pin or two pins and a link. The power screw 218 is fixed to the opener shank 152 with an actuator body 214. The actuator body 214 contains the power screw 218, gear/nut, and gear train. The motor 216 is also attached to the actuator body 214. The power screw 218 moves in a linear fashion but is constrained from rotating about its axis by a key 219 or other suitable structure fixed to the actuator body that runs in a slot 221 in the power screw 218. The power screw is moved axially by rotating a gear that threads onto power screw 218. The gear is fixed axially by thrust bearing 240 held in actuator body 214 and is rotated by gear teeth that are machined on its outer diameter. A gear train between motor 216 and gear 238 then provides rotational power from motor 216 to gear 238 at the proper ratio to obtain the force needed by power screw 218. One feature of the power screw is that the small helix angle of the threads locks or prevents rotation of the gear 238, by means of contact friction between the threads of the power screw and gear 238, when axial forces are exerted on power screw 218. This helps maintain the depth once it has been set. Also, motor 216 can constantly sense position with the rotary encoder and could be configured to correct the position should a vibrational load cause the position to change away from the target.

Figure 8:
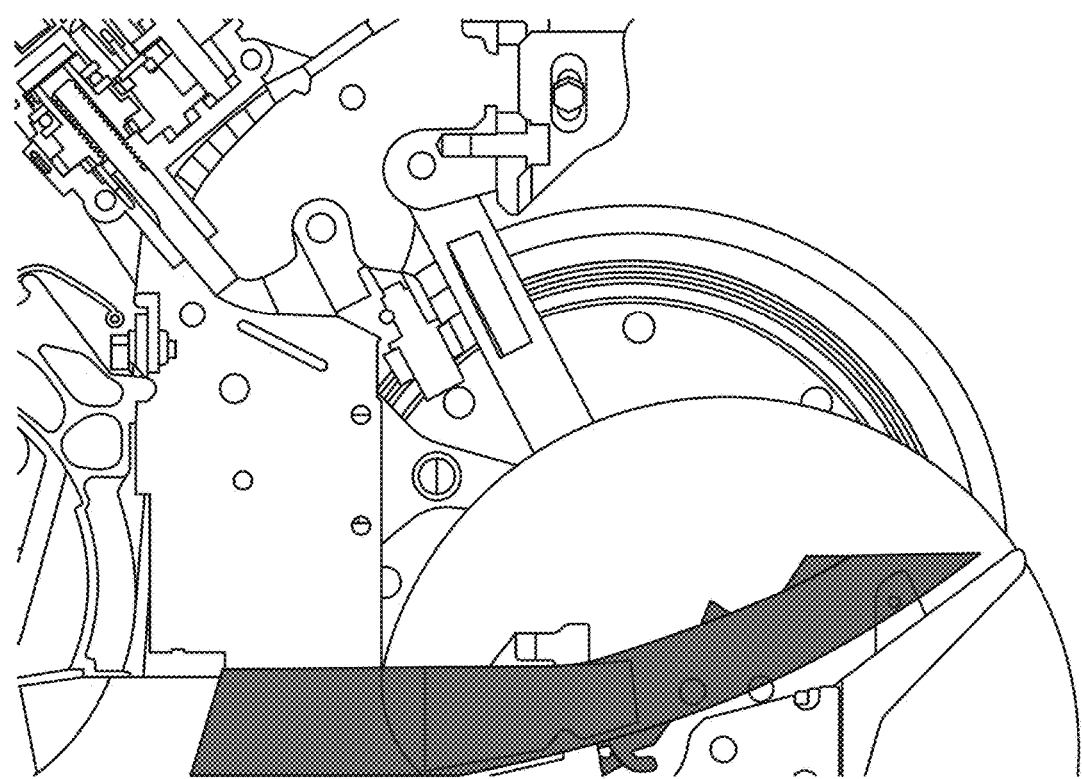
FIGS. 7 and 8 show a row unit being set at different furrow depths using the actuator shown in FIGS. 5 and 6.
Figure 7:
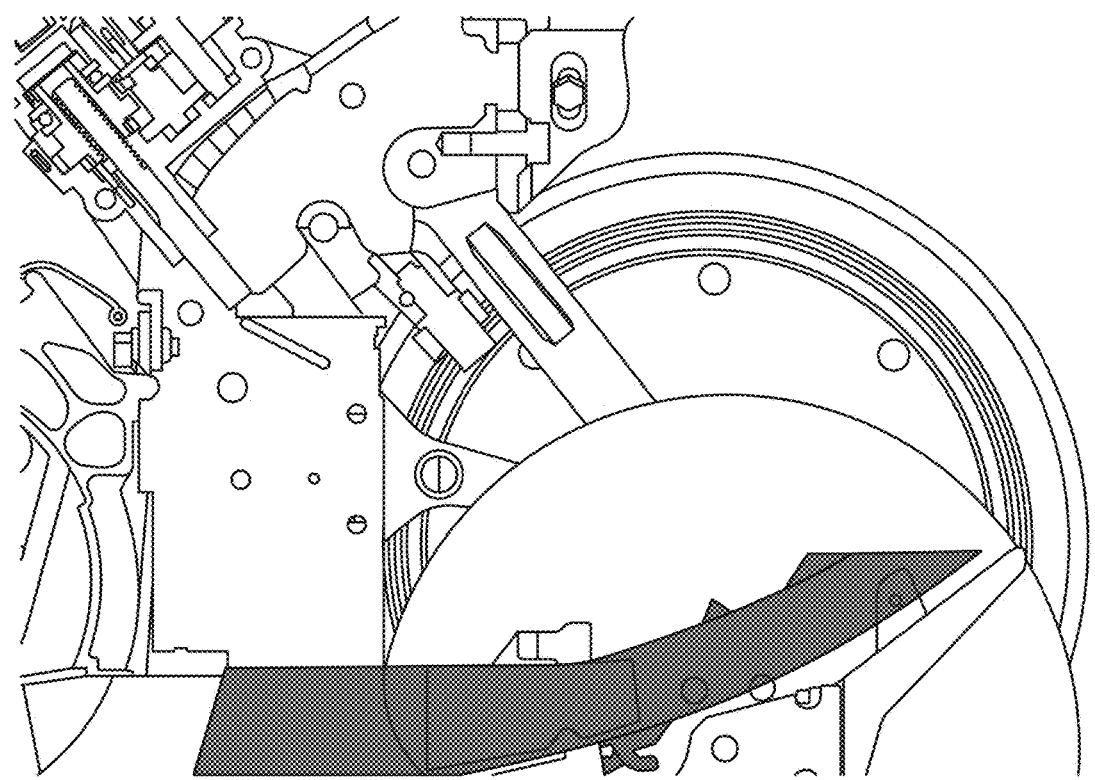

FIGS. 7 and 8 show a row unit being set at different furrow depths using the actuator shown in FIGS. 5 and 6. FIGS. 7 and 8 show the same portion of a row unit at different depth settings. Contrasting FIGS. 7 and 8, FIG. 7 shows power screw 218 displaced lower than is shown in FIG. 8. This lower displacement causes gauge wheel arm 148 to have an upper stop that is lower than that shown in FIG. 8. Thus, FIG. 7 shows a shallower depth setting than FIG. 8.

Figure 9:
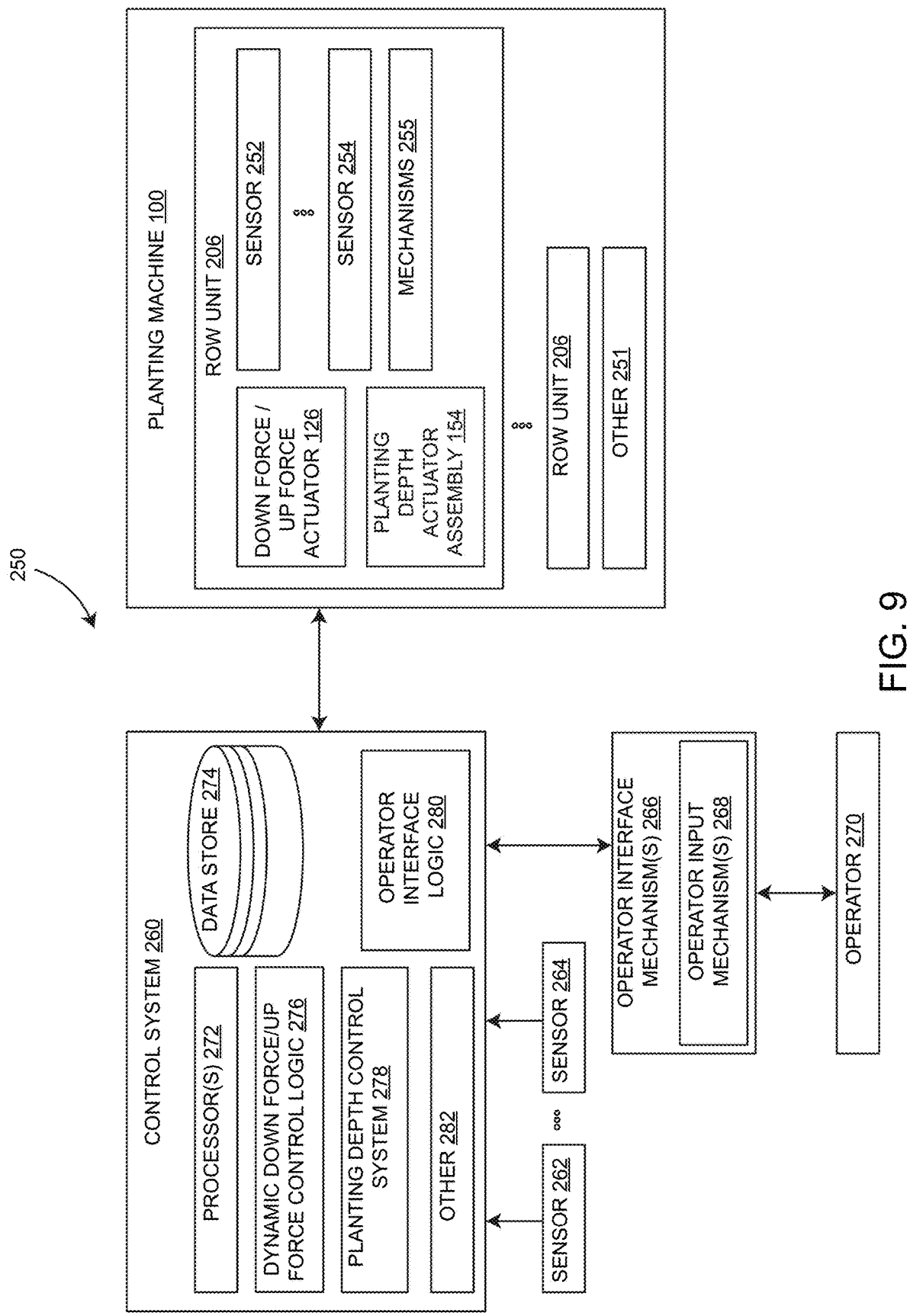
FIG. 9 is a block diagram showing one example of a planting machine architecture.

FIG. 9 is a block diagram of one example of a planting machine architecture 250 for automatically controlling planting depth. Architecture 250 includes a planting machine, such as planter 100 (also shown in FIG. 1) which has a plurality of row units (such as row unit 206 shown in FIG. 3) and it can have other items 251. Each row unit may have one or more sensors 252-254. Row unit 206 is also shown with other mechanisms 255. Mechanisms 255 illustratively include gauge wheels 116, disc opener 114, closing wheels 118, and some or all of the other mechanisms shown in previous figures on row unit 106 or different mechanisms.

Also, as shown in FIG. 9, each row unit 206 may have the downforce actuator 126 and a planting depth actuator assembly 154. In some examples, downforce actuator 126 illustratively exerts additional downforce on row unit 206 to keep gauge wheels 116 in contact with the ground, as discussed above with respect to FIG. 3. Also, in one example, downforce actuator 126 may also be an upforce actuator which can be used to decrease the effective load that the gauge wheels 116 need to bear. These and other examples are described in more detail below.

Planting depth actuator assembly 154, as discussed above, illustratively controls the distance between the lower most points of the gauge wheels 116 and disc opener 114. Therefore, it can be actuated to control the planting depth at which row unit 206 plants seeds. Sensors 252-254 can be any of a wide variety of sensors. For instance, in one example, sensor 252-254 include a downforce sensor that senses the downforce exerted by downforce actuator 126 on row unit 206. In another example, they can be a combination of sensors and logic that senses a downforce margin, as described above. Sensors 252-254 may illustratively include a position sensor that senses the position of gauge wheels 116 relative to disc opener 114. It can be a sensor that senses the depth of the seed trench. The sensors can include a wide variety of other sensors as well, such as sensors that sense soil characteristics (such as moisture, soil compactness, soil type, etc.), and environmental characteristics. The sensors can sense a wide variety of other variables (machine variables, soil variables, environmental variables, etc.) as well.

FIG. 9 also shows that, in one example, control system 260 can illustratively receive inputs from additional sensors 262-264, and it can also interact with operator interface mechanisms 266. Operator interface mechanisms 266 can include operator input mechanisms 268 that operator 270 can interact with in order to control and manipulate control system 260, and some parts of planting machine 100.

Therefore, in the example illustrated, control system 260 can include one or more processors 272, a data store 274, dynamic downforce/upforce control logic 276, planting depth control system 278, operator interface logic 280, and it can include a wide variety of other items 282. Dynamic downforce/upforce control logic 276 is included in scenarios where downforce/upforce actuator 126 can be dynamically controlled by operator 270, from the operator compartment of the tractor or other towing vehicle, to controllably impart a either downforce on row unit 206, an upforce, or both.

Planting depth control system 278 illustratively receives sensor inputs and/or operator inputs. It controls planting depth actuator assembly 154, on each row unit 206, in order to control the planting depth used by the row units 106 on planting machine 100.

Operator interface mechanisms 266 can include a wide variety of mechanisms, such as a display screen or other visual output mechanisms, audio mechanisms, haptic mechanisms, levers, linkages, buttons, user actuatable display elements (such as icons, displayed links, buttons, etc.), foot pedals, joysticks, steering wheels, among a wide variety of others. Operator interface logic 280 illustratively controls outputs on the operator interface mechanisms 266 and can detect operator inputs through the operator input mechanisms 268. It can communicate an indication of those inputs to other items in control system 260 or elsewhere.

Sensors 262-264 can also be a wide variety of different types of sensors that can be used by dynamic downforce/upforce control logic 276, planting depth control system 278, or other items. Some of these are described in greater detail below.

FIG. 9 shows that, in one example, architecture 250 includes a planting machine (such as planting machine 100 shown in the previous figures) and a control system 260. Control system 260 can be carried by the towing machine that is towing planting machine 100, it can be carried by planting machine 100, or it can be distributed among the towing machine, planting machine 100 and a wide variety of other locations. In one example, control system 260 generates control signals to control the planting machine 100, and as will be described in greater detail more specifically below, the planting depth that the row units on planting machine 100 are using to plant seeds. FIG. 9 also shows that, in one example, control system 260 can receive sensor signals from a plurality of different sensors 262 and 264. It also shows that operator 270 (which may be the operator of the towing vehicle) can interact with control system 260 through operator interface mechanisms 266 which can include, for instance, operator input mechanisms 268.

Figure 10:
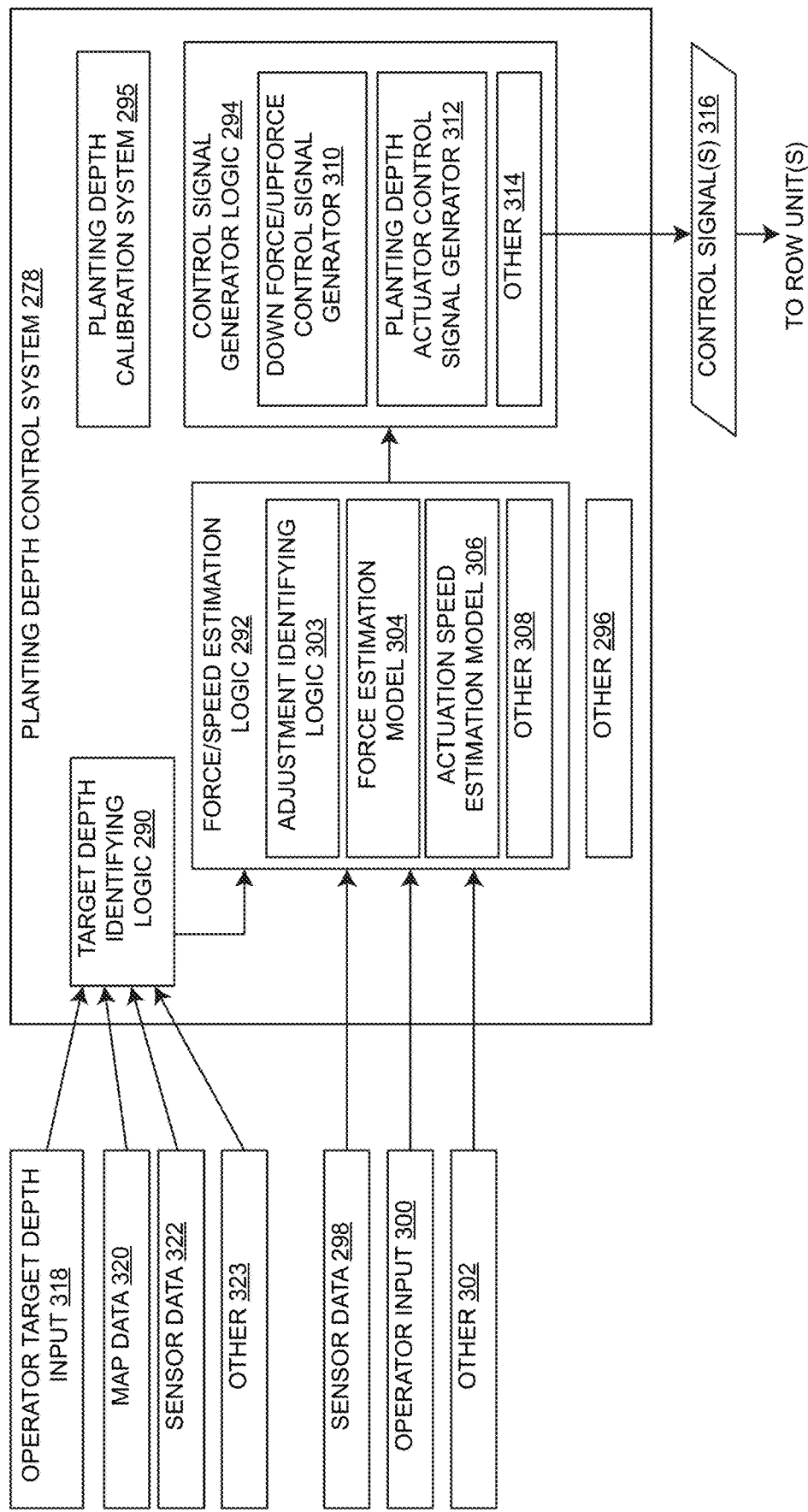
FIG. 10 is a block diagram showing one example of a planting depth control system in more detail.

FIG. 10 shows one example of planting depth control system 278 in more detail. In the example shown in FIG. 10, planting depth control system 278 can include target depth identifying logic 290, force/speed estimation logic 292, control signal generator logic 294, planting depth calibration system 295, and it can include a wide variety of other items 296. Force/speed estimation logic 292 illustratively receives a target depth which identifies a desired planting depth for planting machine 100. It can also identify individual planting depths for individual row units 106 on planting machine 100. It can receive the target depth from target depth identifying logic 290, from an operator or from another source.

Target depth identifying logic 290 can identify the target depth in a variety of different ways. For instance, it can receive an operator target depth input 318 that identifies a target depth input by the operator 270. It can include map data 320 which includes a wide variety of different information correlated to different geographic locations within the field that is being planted. The information can include soil moisture information, soil type information, soil compactness information and a wide variety of other information that can be used by target depth identifying logic 290 to identify a desired target depth. Logic 290 can also receive sensor data 322 which is indicative of one or more variables that may have an effect on the identified target planting depth. Again, for instance, sensor data 322 can be data generated from a soil moisture sensor, a soil type sensor, a soil or environmental characteristic sensor that senses other soil characteristics (such as compaction or other characteristics) or other environmental characteristics, such as topology, position, etc. Sensor data can include data generated by machine sensors that sense machine variables or other items.

As planting machine 100 moves about the field, it may be that the target planting depth identified by target depth identifying logic 290 changes based on the location of planting machine 100. Therefore, logic 290 may receive a location sensor input indicative of that location, and other inputs that bear on the desired target planting depth, and it may modify the target planting depth as machine 100 moves about the field. Thus, the target planting depth provided by logic 290 to force/speed estimation logic 292 may vary. All of these and other scenarios are contemplated herein.

Force/speed estimation logic 292 is also shown receiving, by way of example, sensor data 298, one or more operator inputs 300, and it can include a wide variety of other inputs 302. It illustratively generates an estimate of the force and speed that will be needed to control planting depth actuator assembly 154 in order to achieve the target planting depth. Thus, it can include force estimation model 304 that is used to estimate the force that will be needed to achieve the target planting depth. It can also illustratively include actuation speed estimation model 306 that generates an estimate of the speed at which planting depth actuator assembly 154 is to be actuated to move from a current planting depth to the target planting depth. It can include other items 308 as well. By way of example, force estimation model 304 may estimate a force that needs to be applied to the gauge wheel arms 148 in order to move the gauge wheel in the desired direction (either up or down relative to the disc opener 114). Actuation speed estimation model 306 illustratively generates an estimate indicative of how quickly actuator assembly 154 should be actuated to move the gauge wheels to the desired target depth. For instance, it may be that it is undesirable to change the depth profile of the seed trench too quickly. Instead, it may be that it is desired to change planting depth gradually to achieve a desired trench contour or trench depth profile. Thus, actuation speed estimation model 306 can generate an estimate indicating how quickly the actuator assembly 154 should be actuated to change the planting depth.

In one example, the force estimation and speed estimation are provided to control signal generator logic 294 which illustratively includes downforce/upforce control signal generator 310, planting depth actuator control signal generator 312, and it can include other items 314. In some examples, control signal generator 310 will control the downforce/upforce actuator 126 (shown in FIG. 3) to remove any applied downforce or to supply an upforce so that the planting depth actuator assembly 154 need not overcome any applied downforce in changing the planting depth. Control signal generator 312 then illustratively controls the planting depth actuator assembly 154 to change the planting depth at a speed corresponding to the speed estimated by model 306. The output of control signal generator logic 294 is illustratively a set of control signals that are output to row units 206 in order to control downforce/upforce actuator 126 and/or planting depth actuator assembly 154.

As mentioned above, one parameter associated with planting is the depth below the surface of the soil that seed is planted. Various methods have been shown for sensing the depth at which a seed is being placed, while planting. The planting depth (along with other variables, such as soil texture, temperature, moisture, etc.) can affect emergence time and plant vigor. Generally, yield is optimized by having all plants emerge as evenly as possible, but there may be conditions in which it is best to stagger emergence or plant maturity. In addition, the emergence may differ, from one piece of ground to another, if planting depth is maintained constant. Therefore, varying plating depth may be used to obtain uniform emergence as well.

While the row unit is engaging the ground and planting, the forces needed to change the planting depth on-the-go, can be significant. Actuators that are large enough and strong enough to operate against such forces can be relatively large and costly. One way of changing planting depth, as is described below, may involve stopping the planting machine, lifting the row units out of the ground, and then automatically actuating the actuator assembly 154 to change the planting depth automatically, before continuing. This may happen at the end rows or it may occur during a brief pause of forward motion to raise the machine while planting to facilitate such an adjustment. The actuators needed to change planting depth can then be relatively small because they need not overcome the large downforces involved with some types of planting equipment.

In another example that is described in more detail below, the downforce/upforce control signal generator 310 controls the downforce/upforce actuator 126 in conjunction with the planting depth actuator control signal generator 312 controlling the planting depth actuator assembly 154, to change planting depth. Control signal generator 310 can control downforce actuator 126 to momentarily relieve any applied downforce, and to optionally provide the force needed to either raise (upforce) or further lower (downforce) one or more row units 206 into the ground with respect to where the gauge wheels 116 are riding at the soil surface. Control signal generator 312 can then control planting depth actuator assembly 154 to simply lock in the new desired depth. This reduces the need of assembly 154 to be able to exert the extra force (and thus incur the extra cost and extra structural stress) that is needed to overcome the downforce, while still allowing the row unit 206 to adjust planting depth on-the-go. Thus, it can be seen that in one example, the downforce/upforce control signal generator 310 can be used to provide all of the power needed to change the planting depth, in which case planting depth actuator control signal generator 312 controls planting depth actuator assembly 154 to simply lock in the new depth. In another example, the downforce/upforce control signal generator 310 can generate a portion of the needed force to adjust the relationship between gauge wheels 116 and opener 114, or it can simply be used to remove any dynamically applied downforce so the planting depth can be made using a smaller actuator. In these latter two scenarios, the planting depth actuator assembly 154 includes an actuator in addition to actuator 126 which provides additional planting depth adjustment force to change the relationship between gauge wheels 116 and disc opener 114, and to make the planting depth adjustment, and then to lock that adjustment in place.

Before describing the operation of planting depth control system 278 in more detail, a number of things will first be noted. When the planting depth of a row unit is changed, it can be changed either from a shallower depth to a deeper depth, or from a deeper depth to a shallower depth. When the planting depth is changed within a field, as the planting machine 100 is moving and planting (e.g., when it is changed on-the-go), it may be desired that the transitions between two planting depth settings and corresponding trench contours be uniform. That is, to be uniform, the trench contour when moving from a shallow planting depth to a deeper planting depth should be the same as the trench contour when moving from a deeper planting depth to a shallower planting depth.

Figure 11A:
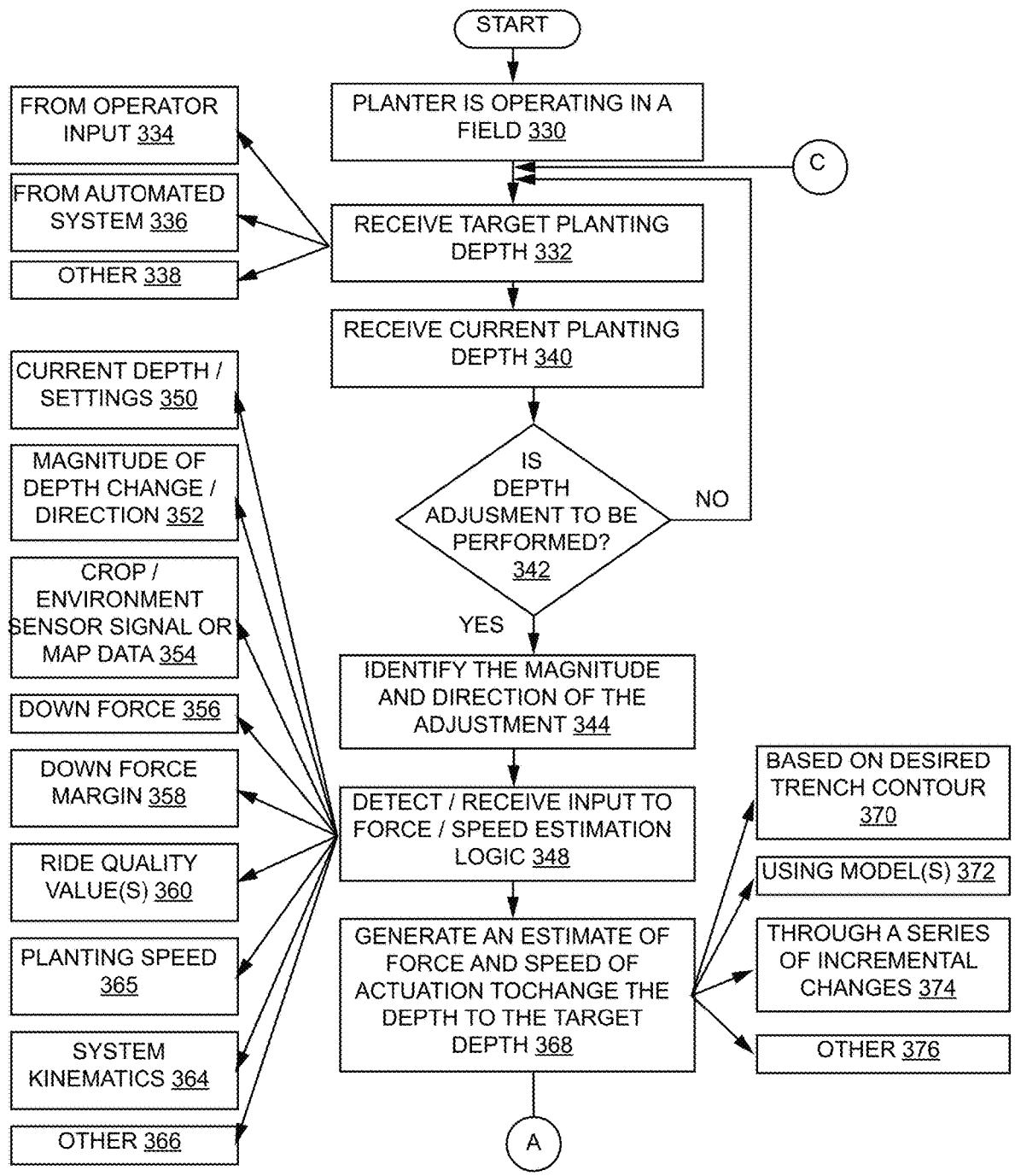
FIGS. 11A and 11B (collectively referred to herein as FIG. 11) show a flow chart illustrating one example of the operation of the planting depth control system shown in FIG. 10.
Figure 11B:
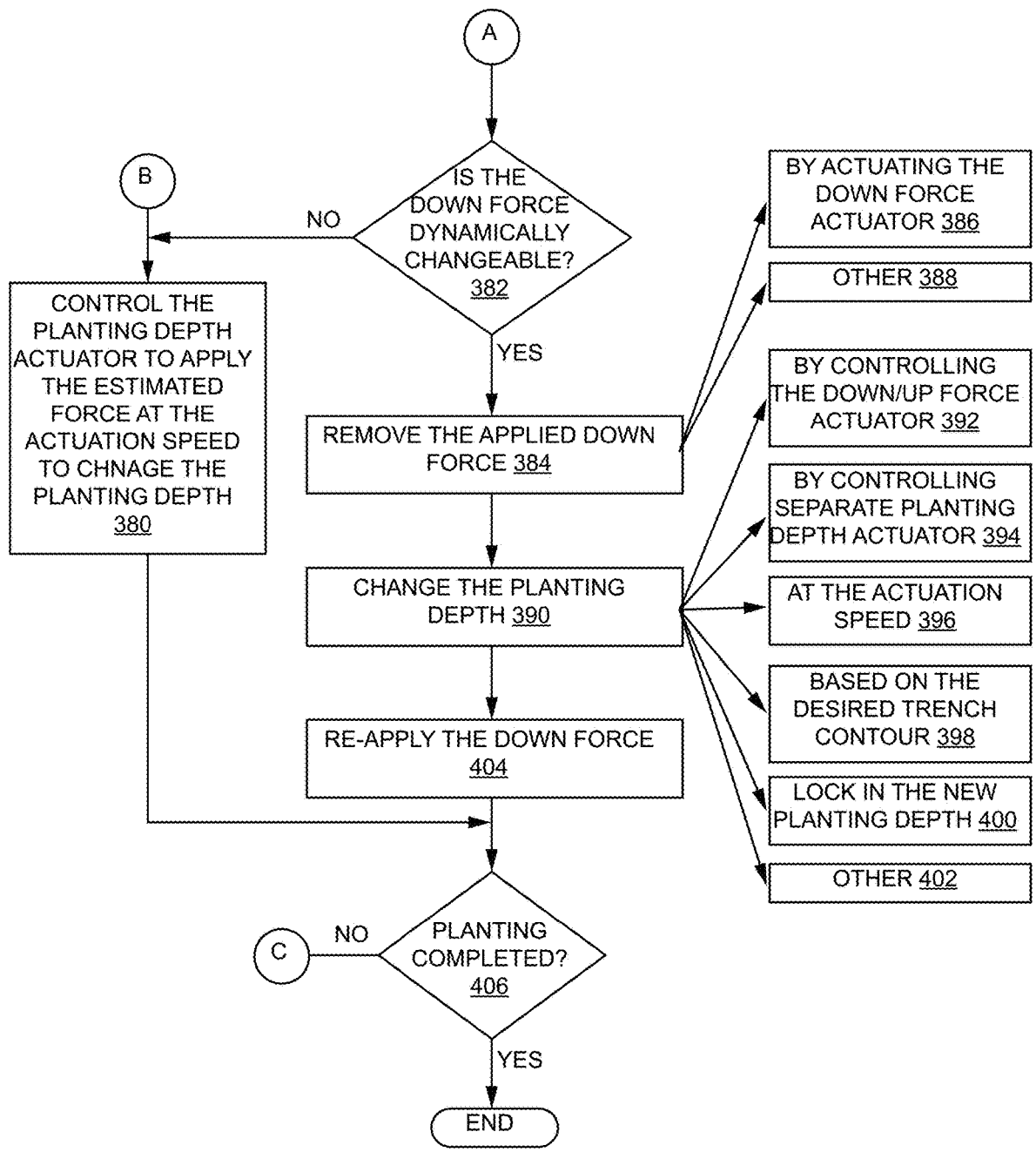

FIGS. 11A and 11B (collectively referred to herein as FIG. 11) illustrate a flow diagram showing one example of the operation of planting depth control system 278 and a row unit 206 of planting machine 100, in changing planting depth, in more detail. It is first assumed that planter 100 is operating in a field. This is indicated by block 330 in the flow diagram of FIG. 11. Force/speed estimation logic 292 then receives a target planting depth. This is indicated by block 332. Again, as discussed above, this can be based on an operator input 318. This is indicated by block 334. It can also be from an automated system, such as target depth identifying logic 290. This is indicated by block 336. It can be received in a wide variety of other ways as well, and this is indicated by block 338.

Adjustment identifying logic 303 then illustratively receives the target depth, and a current planting depth. This is indicated by block 340 in the flow diagram of FIG. 11. The current planting depth can be an estimated planting depth that is estimated based on sensor signals that sense the position of gauge wheels 116 and openers 114. It can also be a directly sensed planting depth that uses a planting depth sensor to sense the depth of the seed trench or furrow.

Adjustment identifying logic 303 then identifies whether an adjustment is to be performed based on the received target planting depth and the current planting depth. If so, it illustratively identifies a magnitude of the adjustment and a direction for the adjustment (such as how big the adjustment is and whether it is to be made to move the planting depth from shallower to deeper or deeper to shallower). It provides these items to force estimation model 304 and actuation speed estimation model 306. Determining whether an adjustment is to be performed, and the magnitude and direction of the adjustment, is indicated by blocks 342 and 344 in FIG. 11.

It will be noted that models 304 and 306 can be integrated into a single model that receives the inputs and generates outputs indicative of the estimated force and speed of actuation. They can be two separate models that process the inputs in parallel or sequential models where the output of one model feeds into the input of another model. All of these and other architectures are contemplated herein.

It will also be noted that force/speed estimation logic 292 (and models 304-306) can detect or receive a wide variety of inputs that can be used to generate the outputs. This is indicated by block 348. For instance, the inputs can include an input indicative of the current planting depth and the current actual planting depth setting. This is indicated by block 350. They can include the magnitude of the planting depth adjustment and direction of the planting depth adjustment as indicated by block 352. They can include a wide variety of crop or environmental sensor signal data or map data 354. This can include such things as crop characteristics sensed by crop characteristic sensors, environmental characteristics sensed by environmental characteristic sensors, topology information input by a topology map. Among a wide variety of other things. The inputs can also include the downforce 356 acting on the row unit 106 as well as the downforce margin 308. Examples of these are described above.

Logic 292 can receive a ride quality value 360 indicative of a ride quality of the row unit 206. This value can be generated by accelerometers that generate a signal indicative of accelerations measured on the row unit 206, or in other ways. It can receive a planting speed input 365 indicative of the ground speed of the planting machine 100. It can include an input identifying system kinematics (such as the measurements, angles, and other values that define the kinematics of the mechanisms used in adjusting planting depth). The system kinematics are indicated by block 364 in the flow diagram of FIG. 11. And it can include a wide variety of other inputs, such as gauge wheel position, or other items 366.

Force estimator model 304 and actuation speed estimation model 306 then generate an estimate of the force and speed of actuation to change the planting depth to the target depth. This is indicated by block 368. This can be based on a desired trench contour 370. The desired trench contour 370 may define how quickly the depth is to be changed or the magnitude of the change per lineal foot of trench, or other things. Thus, given the planting speed and the adjustment magnitude, the force and speed estimate may be output to change the planting depth based on the desired trench contour.

Again, the estimations can be generated using one or more models. This is indicated by block 372.

The depth adjustment can also be made through a series of incremental changes. This is indicated by block 374. By way of example, it may be desirable to make a planting depth adjustment in incremental steps. Therefore, the output of force/speed estimation logic 292 may be an output indicating how to control the planting depth actuator assembly 154 to move from the current planting depth to the target planting depth in a series of incremental steps. This may be done instead of controlling the actuator assembly 154 to move continuously from the current depth to the target depth. The estimate of force and speed of actuation to change the current planting depth to the target planting depth can be done in a wide variety of other ways as well, and this is indicated by block 376.

As discussed above, in one example, the force and speed estimates may be made in a system that does not have any additional applied downforce or that does not have a dynamically changeable downforce (such as in a system that does not have a hydraulic or pneumatic downforce actuator but is instead in a system that has a relatively static downforce system, such as one that imparts downforce through a set of mechanical springs or in other ways).

If, as indicated by block 378, the planting depth adjustment is not to be made against an actively applied downforce, then planting depth actuator control signal generator 312 illustratively controls the planting depth actuator assembly 154 to move to the commanded position at the actuation speed (received from model 306) to change the planting depth. This is indicated by block 380. Again, this can be provided as a continuous signal to continuously actuate the actuator assembly 154 to move the gauge wheel arms 148 to change the planting depth in one continuous control step. It can also be done by making incremental changes that incrementally move the gauge wheel arms 148 to change the planting depth incrementally, from the current planting depth to the target planting depth. It can be made in other ways as well.

If, at block 378, it is determined that the planting depth change is to be made against an actively applied downforce, then, at block 382, downforce control signal generator 310 determines whether the downforce is applied by a dynamically changeable system, or whether it is a relatively static (e.g., mechanical spring-based) system. If there is an active downforce applied to the row unit, but it is not dynamically changeable, then, processing again continues at block 380 where planting depth actuator control signal generator 312 generates control signals to control the planting depth actuator assembly 154 to change the planting depth as discussed above.

However, if, at block 382, it is determined that the actively applied downforce is dynamic in nature, and that it can be controlled on-the-fly, then downforce control signal generator 310 generates control signals to control downforce actuator 126 to remove the actively applied downforce. This is indicated by block 384. In the example described herein, this is done by controlling the downforce actuator 126 to become passive or to control the actuator to actively remove the downforce in other ways as well. This is indicated by blocks 386 and 388. Also, in one example, the row unit can be temporarily lifted out of the ground so that the actively applied downforce is no longer working against the depth setting change (e.g., change can be made during a headland turn or during a brief pause while the row unit 106 is lifted out of the ground). These are examples only.

Planting depth actuator control signal generator 312 then generates control signals 316 to control the planting depth actuator assembly 154 to change the planting depth. This is indicated by block 390 in the flow diagram of FIG. 11. It will be noted that, as described above, the planting depth actuator assembly 154 may be incorporated into the downforce actuator 126, so that the downforce actuator 126 also includes an upforce actuator that can exert upforce on the row unit, instead of just downforce. In that case, the upforce actuator can be controlled in making the planting depth change as well. This is indicated by block 392. The planting depth can be changed by controlling a separate planting depth actuator assembly 154, as discussed above. This is indicated by block 394. The actuator (e.g., the motor) in the planting depth actuator assembly 154 can be controlled at the estimated actuation speed so that the planting depth adjustment is made over a certain period of time. This is indicated by block 396. The planting depth actuator assembly 154 can be controlled based on a desired trench contour. For instance, it can be controlled to make the adjustment, while considering the speed of the planting machine 100, so that the change from the current depth to the target depth is made according to a desired trench contour (so that the trench does not change depth too rapidly over a given lineal distance) or otherwise. Controlling the planting depth actuator assembly based on a desired trench contour is indicated by block 398.

Once the new planting depth is achieved, then planting depth actuator control signal generator 312 generates control signals to control the planting depth actuator assembly 154 to lock the new planting depth in place. This is indicated by block 400. In another example, the new planting depth can be locked in in other ways so that forces or accelerations applied to the row unit 206 through the gauge wheels 116 do not transmit back to the actuator (e.g., the electric motor or other motor) in the planting depth actuator assembly 154. Instead, those forces or accelerations are illustratively transmitted to the frame of the planting machine, such as the shank 152, or other structural mechanisms.

The planting depth adjustment can be made in a wide variety of other ways as well. This is indicated by block 402 in the flow diagram of FIG. 11.

Once the planting depth adjustment has been made and locked in, then downforce control signal generator 310 illustratively controls downforce actuator 126 to reapply the active downforce that was removed at block 384. Reapplying the downforce after the planting depth adjustment is made is indicated by block 404 in the flow diagram of FIG. 11.

While the system control may be effected as described above, in some examples, the depth actuators may be powerful enough to change depth in either direction within a range of downforce margin that is allowed. In such systems, there is no need to remove applied downforce before changing the planter depth. The systems that control the downforce actuators and the depth actuators need not be coupled and may in fact run independently and in parallel. The dynamically changeable downforce system is constantly running while planting; measuring gauge wheel downforce, comparing force to set margin, then making a downforce actuator change. When commanded to change the depth, the downforce system reads the downforce sensor and automatically adjusts the downforce actuator to maintain the set margin before, during and after the depth is changing. The downforce system operates quickly enough, tens to hundreds of times during a depth change, to keep the margin sufficiently constant.

The depth control system will constantly monitor the motor position; which can be translated into a depth using a lookup table or equation and calibration values. When a depth change is desired, the adjustment identifying logic 303 determines the motor position required to obtain the desired planter depth. The new motor position is then sent to the planting depth control signal generator 312, which in turn commands the motor to move a certain direction and speed. The motor position is monitored by the control signal generator 312 throughout the depth move and adjustments in the motor speed are made until the desired motor position/depth is achieved.

It will be appreciated that, in one example, planting depth control system 278 can continue to monitor various sensor signals and other inputs and make planting depth changes, on-the-go, until the planting operation is completed. This is indicated by block 406 in the flow diagram of FIG. 11.

Figure 12:
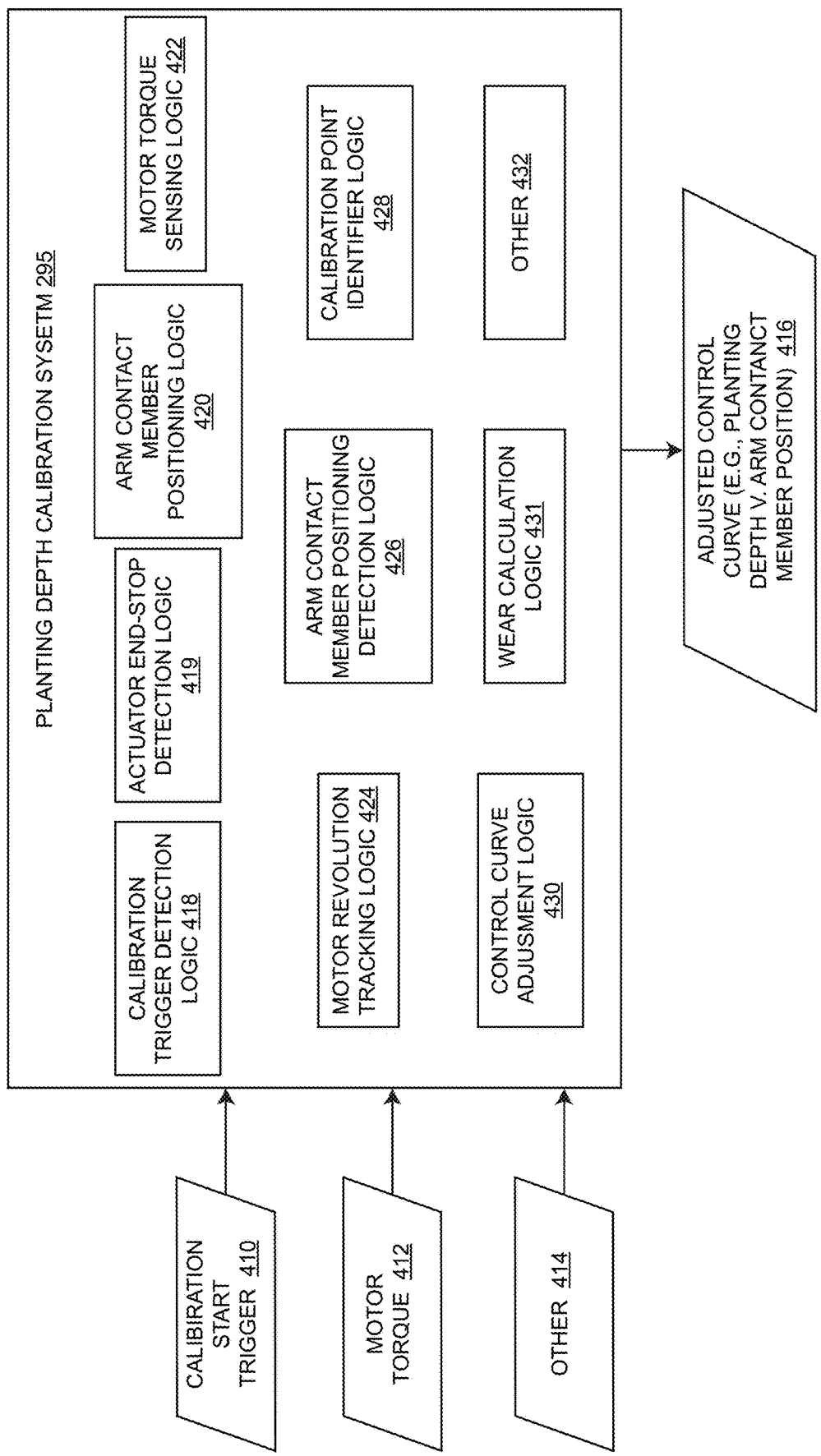
FIG. 12 is a block diagram of one example of a planting depth calibration system in more detail.

FIG. 12 is a block diagram of one example of planting depth calibration system 295. In the example shown in FIG. 12, system 295 is seen receiving a calibration start trigger 410, motor torque signal 412, and it can receive a wide variety of other items 414. Based on the received items, it outputs an adjusted control curve 416 that planting depth control system 278 can use to control planting depth. As discussed above, control signal generator logic 294 can access a control curve that plots desired planting depth versus an indication of position of the actuator.

There are some conditions under which the kinematic values may change. For instance, as a row unit 206 is used, the openers 114 and gauge wheels 116 may exhibit wear. This can cause their diameters to change, and they may not change uniformly with respect to one another. Therefore, the position of depth stop rocker 226, as it bears against gauge wheel arms 148, may result in a different planting depth than before the gauge wheels 116 and openers 114 had worn. Also, the kinematic values used to generate the control curve may change based on manufacturing and assembly tolerances. Therefore, from one row unit to the next, the kinematic values may be slightly different, even when the parts are new. These and other factors can affect the kinematic values and can thus affect the relationship between the position of depth stop rocker 226, and the resulting planting depth. Thus, planting depth calibration system 295 can intermittently run a calibration process that adjusts the control curve based upon the new kinematic values identified during the calibration process. The adjusted control curve 416 can then be used by planting depth control system 278 to control planting depth.

In the example shown in FIG. 12, planting depth calibration system 295 illustratively includes calibration trigger detection logic 418, actuator end-stop detection logic 419, arm contact member position logic 420, motor torque sensing logic 422, motor revolution tracking logic 424, arm contact member position detection logic 426, calibration curve zero point identifier logic 428, control curve adjustment logic 430, wear calculation logic 431, and it can include a wide variety of other items 432. Before describing the operation of system 295 in more detail, a brief description of some of the items in system 295, and their operation, will first be provided.

Calibration trigger detection logic 418 detects a calibration start trigger 410 that indicates that a calibration operation is to be performed. This can include an operator input, or it can include an automated trigger, such as where the system monitors a number of acres that have been planted since the last calibration process was performed. These and other triggers are discussed below.

Arm contact member positioning logic 420 illustratively generates an output to control signal generator logic 294 (shown in FIG. 10) to generate control signals to move depth stop rocker 226 to a desired position along power screw 218. Actuator end-stop detection logic 419 is used to sense the actuator travel limits by reading motor torque 412 or other sensors 414. Motor torque sensing logic 422 illustratively receives a motor torque signal 412 indicative of the torque of motor 216 driving power screw 218, in planting depth actuator assembly 154. Motor revolution tracking logic 424 can include a revolution sensor, or another sensor that senses a number of revolutions performed by the output of motor 216 driving power screw 218. Arm contact member position detection logic 426 illustratively detects the position of depth stop rocker 226. This is described in greater detail below. Calibration curve zero-point identifier logic 428 illustratively identifies a new calibration point, and control curve adjustment logic 430 recalibrates (or adjusts) the control curve, based upon calibration points that are identified during the calibration operation. Wear calculation logic 431 can calculate wear on opener 114 and/or gauge wheels 116. This is also discussed in greater detail below.

As mentioned, control curve adjustment logic 430 adjusts the control curve based upon the calibration points identified by calibration point identifier logic 428. In one example, the calibration process can be performed for a plurality of different calibration points, and the control curve can be adjusted based upon all of those points. In another example, the calibration process can be run to identify a single calibration point, and the control curve can be adjusted based upon that calibration point.

Figure 13:
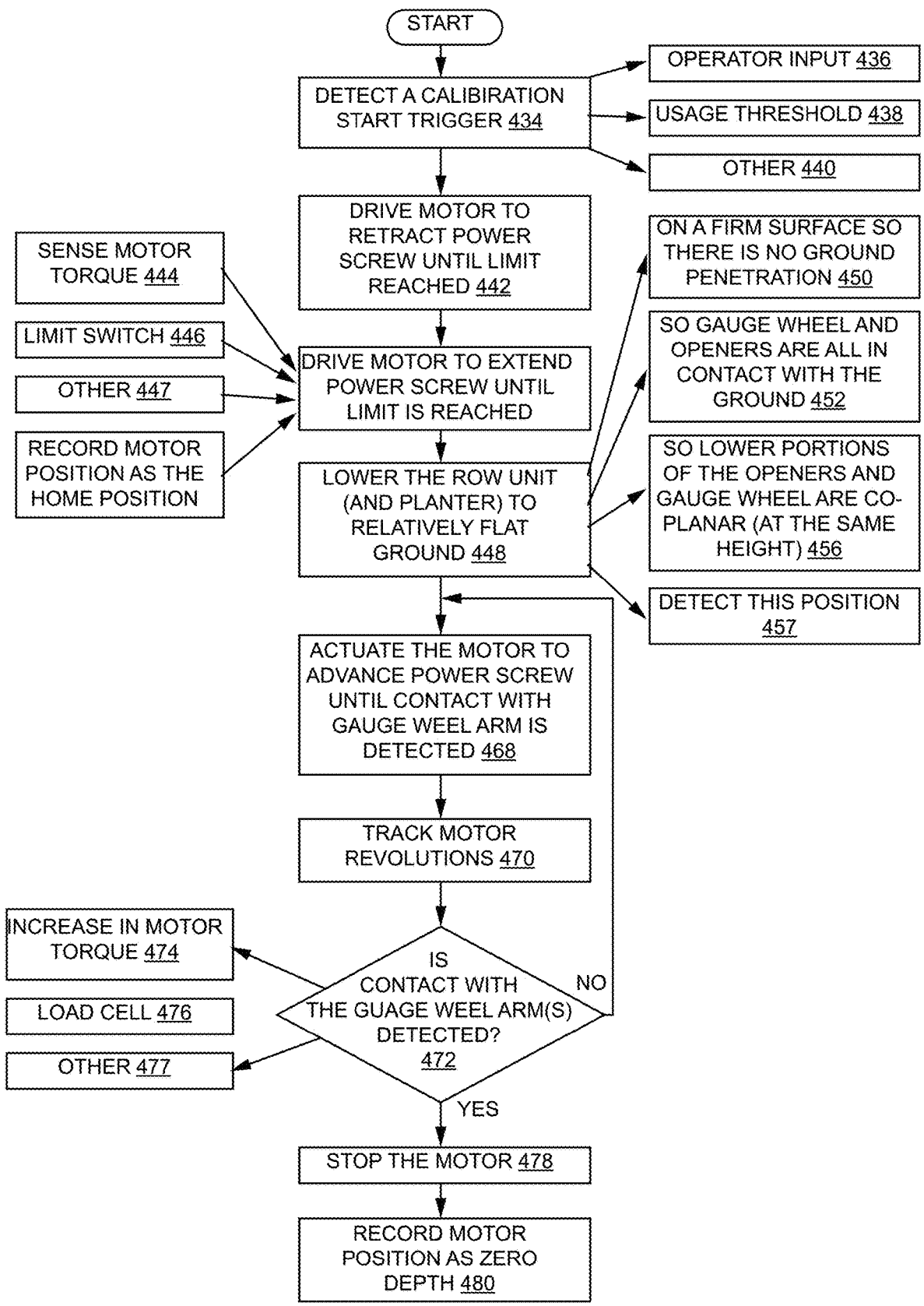
FIG. 13 is a flow diagram illustrating one example of the operation of the planting depth calibration system in more detail.

FIG. 13 shows a flow diagram illustrating one example of the operation of planting depth calibration system 295 in performing a calibration process. In one example, calibration trigger detection logic 418 first detects a calibration start trigger. This is indicated by block 434 in FIG. 13. The calibration start trigger 410 can take a variety of different forms. For instance, it can be an operator input 436, or it can be an indication that a usage threshold has been reached, as indicated by block 438. For example, the calibration start trigger 410 can be generated when control system 260 determines that a row unit has been used to plant a threshold number of acres, or that it has been used for a threshold amount of time. In another example, usage threshold 438 can be determined based on the soil type, so that if the soil is more likely to promote wear, then the trigger is generated earlier than if the soil is less likely to promote wear. The calibration start trigger can be generated based on a wide variety of other criteria that may indicate wear as well, and this is indicated by block 440.

Once the calibration start trigger has been detected, then depth calibration system will command the actuator of the row unit to retract (i.e., raise up into actuator body 214) until the power screw motion limit is detected. This is indicated by block 442. The motion limit may be sensed in different ways. In one example, the torque of the motor is sensed and when the limit is reached, the sensed torque will show an abrupt increase, thereby indicating that the limit has been reached. This is indicated at block 444. In another example, shown at block 446, a limit switch may be mounted within actuator body 214 or another suitable location such that when the power screw reaches its motion limit, the limit switch changes state. Other types of sensing can be used as well, as indicated at block 447. The motor position can be zeroed at this point and this will serve as the home position. If the motor position is lost due to a power cycle or other event, then full calibration procedure is not needed; all that is needed for calibration is to find the home position.

Next, the power screw is extended until the travel limit is sensed by the motor torque increase or by sensing an increase in force on the gauge wheel down force sensor. The motor position is then recorded. Both the home position and the fully extended position can be used to set travel limits for the actuator to protect the geartrain from an overload by not allowing it to crash into the end stops at full speed.

Next, the row unit 206 is lowered (and the entire planter can be lowered) to relatively flat ground. This is indicated by block 448. In one example, the ground may be a firm surface, such as concrete, so that neither gauge wheel 116 nor opener 114 penetrate the ground. This is indicated by block 450. It is also controlled so that both gauge wheels 116 and opener 114 are in contact with the ground as indicated by block 452. This ensures that the lower portions of openers 114 and gauge wheels 116 are generally coplanar, in a horizontal plane, generally defined by the ground surface 454. This is also indicated by block 456 and can be detected automatically or through observation as indicated by block 457.

Once the row unit 206 is lowered onto the relatively flat ground, depth calibration system 295 will command the motor 216 to advance power screw 218 until contact with the gauge wheel arm 148 is detected, as indicated at block 468. During this move, position of motor 216 is tracked the entire time, as indicated at block 470. Advancement of the power screw 218 continues until motor torque sensing logic 422 senses power screw 218 has advanced far enough to cause contact with gauge wheel arm 148, as indicated by block 472. In one example, such contact is detected by again monitoring motor torque and detecting an abrupt increase in motor torque, as indicated at block 474. In another example, this contact is sensed by monitoring the signal from load sensor 246. Contact can be sensed in other ways as well, as indicated by block 477. Once contact is detected, depth calibration system 295 causes motor 216 to stop rotation, as indicated at block 478.

Once the motor has stopped rotation, the position of the motor is recorded as the zero-depth setting for that row unit, as indicated at block 480. After the calibration sequence is complete motor 216 is commanded to move to a position that will give row unit 206 the desired depth. All commanded moves to given depths are based off of the calibrated zero-depth motor position, the fully retracted motor position, the current motor position/depth and a chart or equation that is derived from experimental data that correlates depth with motor position. During planting, the motor position is constantly monitored and any new depth change commands move the motor until the new desired depth is achieved.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the elements of FIGS. 9, 10, and/or 12, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
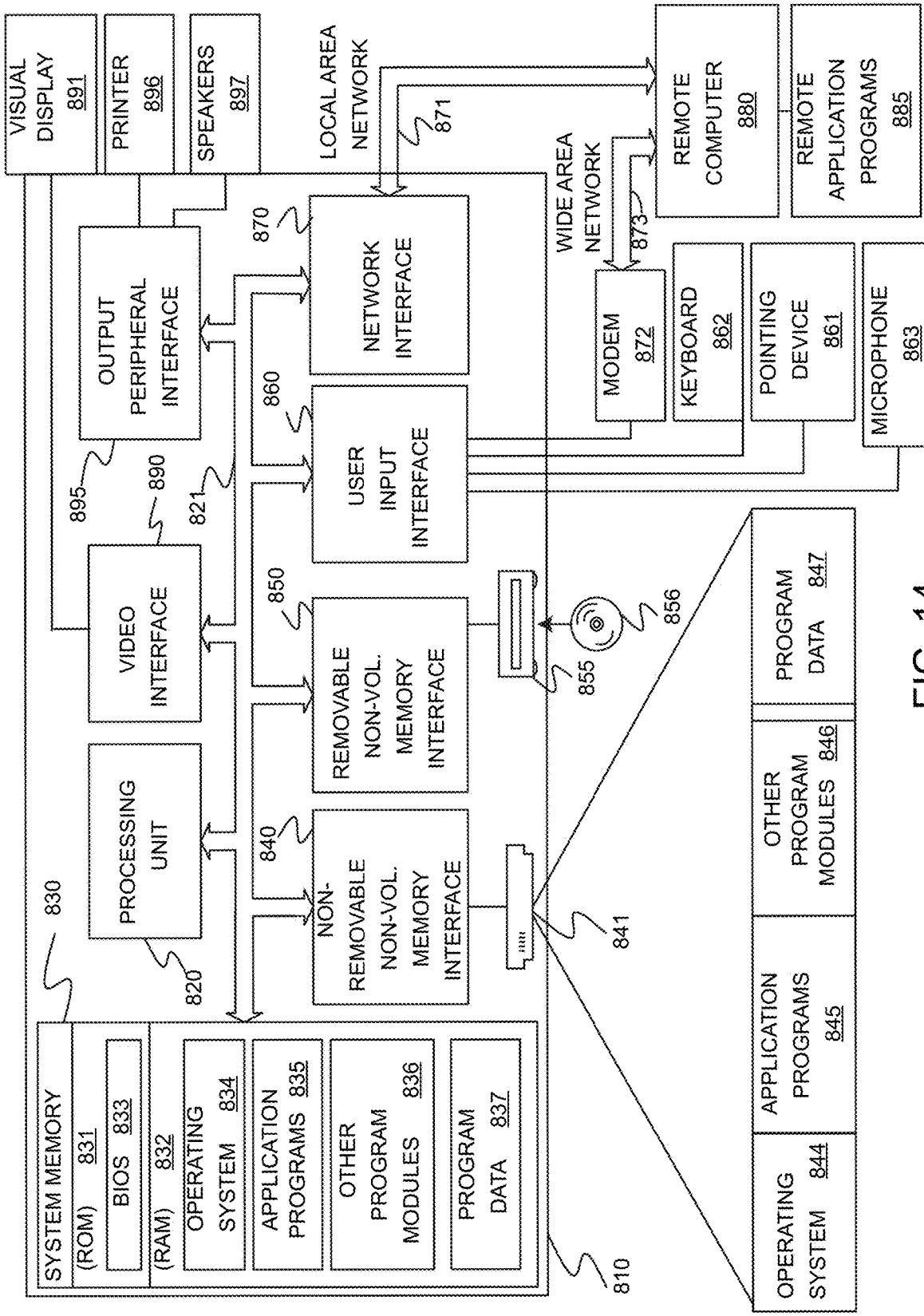
FIG. 14 is a block diagram of one example of a computing environment that can be used in the architectures shown in the previous figures.

FIG. 14 is one example of a computing environment in which elements of FIGS. 9, 10, and/or 12, or parts of them, (for example) can be deployed. With reference to FIG. 14, an example system for implementing some embodiments includes a general-purpose computing device in the form of a computer 810. Components of computer 810 may include, but are not limited to, a processing unit 820 (which can comprise processors or servers shown in previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 9, 10, and/or 12 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile discs (DVD) or other optical disc storage, magnetic cassettes, magnetic tape, magnetic disc storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disc drive 841 that reads from or writes to non-removable, nonvolatile magnetic media, an optical disc drive 855, and nonvolatile optical disc 856. The hard disc drive 841 is typically connected to the system bus 821 through a non-removable memory interface such as interface 840, and optical disc drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disc drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN, a controller area network CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A row unit on a planting machine, comprising:
   a support frame;
   a trench opener;
   a gauge wheel;
   a gauge wheel arm operably coupling the gauge wheel to the support frame; and
   a planting depth actuator assembly including,
      a linkage operably coupled to the gauge wheel arm to limit a range of motion of the gauge wheel arm,
      a screw member operably coupled to the linkage, the screw member having a threaded portion, and wherein the screw member has a longitudinal axis and is configured to move axially along the longitudinal axis to drive the linkage without rotating about the longitudinal axis,
      a motor operably coupled to the screw member through a plurality of gears providing a mechanical advantage sufficient to prevent rotation of the motor when the motor is not energized to lock an axial position of the screw member, wherein energization of the motor causes the screw member to move axially.

2. The row unit of claim 1 and further comprising a shank movably mounting the gauge wheel arm to the support frame, and wherein the planting depth actuator assembly includes an actuator body mounted to the shank and containing the screw member.

3. The row unit of claim 2 wherein the screw member includes a slot configured to engage a key that is mounted relative to the actuator body to inhibit rotation of the screw member.

4. The row unit of claim 2, wherein the linkage is pivotally mounted to the shank.

5. The row unit of claim 1 and further comprising a load cell operably interposed between the linkage and a mechanical stop in contact with the gauge wheel arm.

6. The row unit of claim 1, wherein the motor is a brushless DC electrical smart motor having a rotary encoder to sense output shaft position of the brushless DC electrical smart motor.

7. The row unit of claim 1, wherein the motor is configured to communicate digitally on a communication bus.

8. The row unit of claim 7, wherein the communication bus is a Controller Area Network (CAN) bus.

9. The row unit of claim 1, wherein the plurality of gears is disposed within the actuator body.

10. The row unit of claim 9, wherein the plurality of gears includes a gear having a threaded surface engaged with the threaded portion of the screw member such that rotation of the gear causes axial movement of the screw member.

11. The row unit of claim 10 and further comprising a thrust bearing disposed between a face of the gear and the actuator body, the thrust bearing being configured to transfer axial loads from the screw member to the actuator body.

12. The row unit of claim 1, wherein the plurality of gears provides a ratio of at least about 32:1.

13. A planting machine, comprising:
a tow bar; and
a plurality of row units coupled to the tow bar, each row unit comprising:
  a support frame;
  a double disk opener;
  a gauge wheel;
  a gauge wheel arm that couples the gauge wheel to the support frame; and
  an automatic planting depth actuator assembly including,
    a linkage operably coupled to the gauge wheel arm to limit a range of motion of the gauge wheel arm,
    a screw member operably coupled to the linkage, the screw member having a threaded portion, and wherein the screw member has a longitudinal axis and is configured to move axially along the longitudinal axis to drive the linkage without rotating about the longitudinal axis, and
    a motor operably coupled to the screw member through a plurality of gears providing a mechanical advantage sufficient to prevent rotation of the motor when the motor is not energized to lock an axial position of the screw member, wherein energization of the motor causes the screw member to move axially to adjust a position of the gauge wheel relative to the double disk opener.

14. The planting machine of claim 13, wherein the automatic planting depth actuator assembly further comprises a load cell operably interposed between the linkage and a mechanical stop in contact with the gauge wheel arm.

15. The planting machine of claim 14, and further comprising a control system operably coupled to the motor and the load cell, the control system being configured to generate a planting depth actuation signal to the automatic planting depth actuator based on a target planting depth.

16. The planting machine of claim 15, wherein the motor is a smart motor and is configured to communicate on a digital communication bus.

17. The planting machine of claim 16, wherein the motor is configured to provide an indication of motor torque and motor position to the control system.

18. A method of calibrating an automatic planting depth control system of row unit on a planting machine, the method comprising:
  causing an electric motor, coupled to a screw member, to fully retract the screw member to a motion limit;
  lowering the row unit onto a flat surface;
  causing the electric motor to advance the screw member until contact with a gauge wheel arm of the row unit is detected while monitoring revolutions of the electric motor;
  saving the number of revolutions of the electric motor as a zero-depth position of the automatic planting depth control system; and
  employing the zero-depth saved position during operation of the automatic planting depth control system to control depth of the row unit.

19. The method of claim 18, wherein the electric motor is a smart motor and detection of at least one of the motion limit and contact with the gauge wheel arm is done by sensing torque of the electric smart motor.

20. The method of claim 18, wherein the electric motor is a smart motor and detection of at least one of the motion limits is done by sensing torque of the electric smart motor and contact with the gauge wheel arm is detected by sensing a load through a load cell on the linkage between the actuator and gauge wheel arm.

* * * * *